United States Patent
Mohan et al.

(10) Patent No.: US 12,531,560 B2
(45) Date of Patent: Jan. 20, 2026

(54) PHASE DETECTION FOR DATA CLOCK SYNCHRONIZATION

(71) Applicant: Texas Instruments Incorporated, Dallas, TX (US)

(72) Inventors: Arun Mohan, Bangalore (IN); Jagannathan Venkataraman, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 214 days.

(21) Appl. No.: 18/400,732

(22) Filed: Dec. 29, 2023

(65) Prior Publication Data

US 2025/0219644 A1   Jul. 3, 2025

(51) Int. Cl.
| | |
|---|---|
| H03L 7/08 | (2006.01) |
| G06F 3/147 | (2006.01) |
| H03L 7/085 | (2006.01) |
| H03M 1/12 | (2006.01) |

(52) U.S. Cl.
CPC .............. *H03L 7/085* (2013.01); *G06F 3/147* (2013.01); *H03L 7/0807* (2013.01); *H03M 1/12* (2013.01)

(58) Field of Classification Search
CPC ........ H03L 7/085; H03L 7/0807; H03M 1/12; G06F 3/147
USPC ........................................................ 375/354
See application file for complete search history.

(56) References Cited

U.S. PATENT DOCUMENTS

| | | | | |
|---|---|---|---|---|
| 7,339,984 | B1* | 3/2008 | Daou | H03L 7/18 |
| | | | | 375/225 |
| 9,065,601 | B1 | 6/2015 | Jenkins et al. | |
| 11,238,204 | B1* | 2/2022 | Huss | G01R 31/318385 |
| 2016/0173111 | A1* | 6/2016 | Cali | H03L 7/1976 |
| | | | | 327/156 |
| 2016/0294538 | A1* | 10/2016 | Chien | H04L 7/0331 |
| 2024/0072811 | A1* | 2/2024 | Chang | H03L 7/08 |

OTHER PUBLICATIONS

Zazzera, "A Bang-Bang All-Digital PLL for Frequency Synthesis," Arizona State University Electronic Theses and Dissertations, May 2012, 112 pages.

(Continued)

*Primary Examiner* — Kevin M Burd
(74) *Attorney, Agent, or Firm* — Mandy Barsilai Fernandez; Frank D. Cimino

(57) ABSTRACT

Methods, apparatus, and systems are described to facilitate phase detection for data clock synchronization. An example phase detection circuit includes a first switch including a control terminal, the control terminal of the first switch coupled to a clock generator; a second switch including a control terminal, the control terminal of the second switch coupled to the clock generator; a first capacitor including a first terminal, the first terminal of the first capacitor coupled to a second terminal of the first switch; a second capacitor including a first terminal, the first terminal of the second capacitor coupled to a second terminal of the second switch; and a comparator including a first input terminal and a second input terminal, the first input terminal of the comparator coupled to the second terminal of the first switch, the second input terminal of the comparator coupled to the second terminal of the second switch.

19 Claims, 12 Drawing Sheets

(56) References Cited

OTHER PUBLICATIONS

Analog Devices, "Synchronizing Multiple High-Speed Multiplexed DACs for Transmit Applications," Maxim Integrated Products Inc, 2014, 7 pages.

Chen, "SerDes Transceivers for High-Speed Serial Communications," Department of Electronics, Carleton University, 2007, 31 pages.

Texas Instrument "What is Clock and Data Recovery (CDR)?" TI Precision Labs—HSSC, prepared by Rodrigo Natal, presented by Nicholaus Malone, 2020, 12 pages.

* cited by examiner

PHASE DETECTION FOR DATA CLOCK SYNCHRONIZATION

TECHNICAL FIELD

This description relates generally to circuits, and, more particularly, to phase detection for data clock synchronization.

BACKGROUND

In some systems (e.g., automotive systems), data output from a device may be received by a retimer. The retimer includes a receiver to receive the data and a transmitter to transmit the data to another device. For example, a receiver can re-generate the data from a sensor and convert the sensor data into parallel data to be processed by processing circuitry. The processing circuitry can then output the processed parallel data to a transmitter to transmit the sensor data to a processing device for processing. Because the receiver converted the sensor data into parallel data, the transmitter can convert the parallel data into a serial data signal responsive to a clock signal and provide the serial data to a computing device to process the serial data.

SUMMARY

An example of the description includes a first switch having a control terminal, a first terminal, and a second terminal, the control terminal of the first switch coupled to a clock generator; a second switch having a control terminal, a first terminal, and a second terminal, the control terminal of the second switch coupled to the clock generator; a first capacitor having a first terminal and a second terminal, the first terminal of the first capacitor coupled to the second terminal of the first switch; a second capacitor having a first terminal and a second terminal, the first terminal of the second capacitor coupled to the second terminal of the second switch; and a comparator having a first input terminal, a second input terminal, and an output terminal, the first input terminal of the comparator coupled to the second terminal of the first switch and the first terminal of the first capacitor, the second input terminal of the comparator coupled to the second terminal of the second switch and the first terminal of the second capacitor.

Another example of the description includes a transmitter circuit having serializer circuitry having parallel input terminals, a clock input terminal, and a serial output terminal, the serializer circuitry to receive parallel data via the parallel input terminals of the serializer circuitry, the serializer circuitry to output data via the serial output terminal of the serializer circuitry responsive to a first clock signal; clock circuitry having a terminal, the clock circuitry to output a second clock signal via the terminal of the clock circuitry; phase detector circuitry including: a switch having a control terminal, a first terminal, and a second terminal, the control terminal of the switch coupled to the clock circuitry, the first terminal of the switch coupled to the serial output terminal of the serializer circuitry; a capacitor having a terminal coupled to the second terminal of the switch; and a comparator having an input terminal and an output terminal, the input terminal of the comparator coupled to the second terminal of the switch and the terminal of the capacitor; and accumulator circuitry having an input terminal and an output terminal, the input terminal of the accumulator circuitry coupled to the output terminal of the comparator, the accumulator circuitry to generate an output signal based on an output of the comparator, the output signal to adjust the second clock signal to the first clock signal.

Another embodiment includes a receiver circuit including an analog-to-digital converter having an input terminal, a clock input terminal, and an output terminal, the analog-to-digital converter to receive analog data via the input terminal of the analog-to-digital converter, the analog-to-digital converter to output data via the output terminal of the analog-to-digital converter responsive to a first clock signal; clock circuitry having a terminal, the clock circuitry to output a second clock signal via the terminal of the clock circuitry; phase detector circuitry including: a switch having a control terminal, a first terminal, and a second terminal, the control terminal of the switch coupled to the clock circuitry, the first terminal coupled to the clock input terminal of the analog-to-digital converter; a capacitor having a terminal coupled to the second terminal of the switch; and a comparator having an input terminal and an output terminal, the input terminal of the comparator coupled to the second terminal of the switch and the terminal of the capacitor; and accumulator circuitry having an input terminal and an output terminal, the input terminal of the accumulator circuitry coupled to the output terminal of the comparator, the accumulator circuitry to generate an output signal based on an output of the comparator, the output signal to adjust the second clock signal to the first clock signal.

BRIEF DESCRIPTION OF THE DRAWINGS

The same reference numbers or other reference designators are used in the drawings to designate the same or similar (functionally or structurally) features.

DETAILED DESCRIPTION

Figure 1:
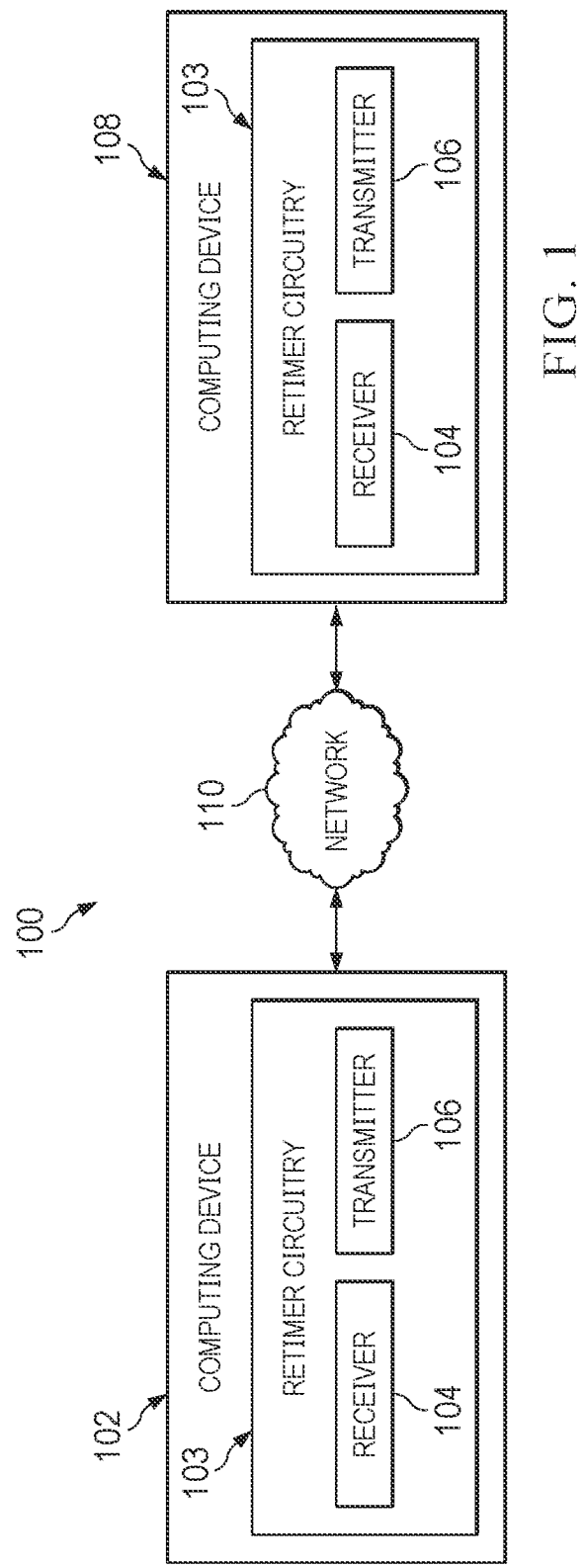
FIG. 1 is an example system having computing devices that include transmitter and a receiver consistent with examples described herein.

The drawings are not necessarily to scale. Generally, the same reference numbers in the drawing(s) and this description refer to the same or like parts. Although the drawings show regions with clean lines and boundaries, some or all of these lines or boundaries may be idealized. In reality, the boundaries or lines may be unobservable, blended, irregular, etc.

In some systems, such as automotive systems, devices communicate with each other via a network connection. A network connection may include an Ethernet connection, a wired bus, or any other wired or wireless connection. In some systems, a computing device of the system may include retimer circuitry. Retimer circuitry includes a receiver, which includes clock and data recovery circuitry, and a transmitter. The receiver receives serial data from one or more computing devices in a system, such as one or more sensors. The receiver may retime the received serial data, covert the serial data to parallel data, and provide the parallel data to a digital processor for processing. After the digital processor processes the parallel data, the digital processor forwards the parallel data to a transmitter.

The transmitter serializes the data and sends out the serialized data to one or more other devices via a network connection. In some examples, receivers may utilize clock and data recovery circuitry to generate a clean recovered clock signal responsive to the input data. The clock may be used by a sampler to sample the input data to reproduce the input data with low jitter. Also, transmitters convert parallel data into serial data that the transmitter transmits via the network connection. Examples described herein include sampling a data stream at particular locations within each data bit and retransmitting the data with low jitter clock at the same average frequency. As used herein, jitter is the timing variation of a set of signal edges from their ideal values. Jitter in clock signals may be caused by noise or other disturbances in the system. Retimer circuitry may sample and retransmit a data stream using a gate or latch that is gated with a clean recovery clock.

In high speed transmitters with low jitter requirements, the final data jitter depends on a clock with which input data is gated or latched. Synchronization of the data and the clock may involve designing a clock path delay to be similar to the data path delay so that the clock and data delays closely track each other across process, voltage, and temperature (PVT). However, such synchronization results in higher jitter in the clock path due to the delay.

To reduce the clock jitter, some systems moved the variable delay to a data path (e.g., a serializer clock-in delay used for converting parallel data to serial data). Because the delay is now in the data path, which is jitter tolerant, the final clock path delay can be reduced and designed to meet jitter requirements. The difference in phase information between the data and clock paths is calculated and applied to the variable delay using phase detector circuitry. For example, the phase detector circuitry can detect a phase difference between the data path and the clock path and a charge pump or accumulator provides an output signal to delay control circuitry. The delay control circuitry can adjust the delay of the data path responsive to the detected phase difference. Digital phase detector circuitry may include a combination of flip flops and logic gates to determine a phase difference between the data path and clock path.

Examples described herein provide phase detector circuitry that is less complicated, uses less silicon area, and is more power efficient than digital phase detection circuits that utilize flip flops. The described phase detector circuitry can output a value corresponding to a phase difference using switches, capacitors, and a comparator, which are smaller and more efficient than flip flops, to implement phase detector circuitry. Examples described herein structure the switches and capacitors to operate as an RC integrator to determine average voltages corresponding to differential voltages on the data path and the clock path. The comparator compares the average voltages to generate an output signal that corresponds to a phase difference. In this manner, an accumulator can adjust the delay of the clock signal used by the serializer to synchronize the data and the clock while also reducing clock jitter. Although examples described herein are described in conjunction with retimer circuitry, examples described herein can be used in conjunction with transmitters, receivers, automotive communications, digital-to-analog converters, analog-to-digital converters, flat panel display (FPD) systems, or any other technology that detects a phase difference between two signals.

FIG. 1 illustrates an example system 100 of computing devices 102 and 108 that may communicate with each other via a network connection 110. The computing devices 102, 108, each include example retimer circuitry 103. The retimer circuitry 103 includes an example receiver 104 and an example transmitter 106. Although the system 100 of FIG. 1 includes two computing devices, there may be any number of computing devices connected via the network 110.

In an example, computing devices 102, 108 of FIG. 1 also include a processing devices that implement one or more protocols that enable the corresponding transmitter 106 and receiver 104 to communicate with each other using serial data via the network 110. The computing devices 102, 108 may be computers, servers, edge or cloud nodes, electrical control units, electronic control modules, or any other processing devices. The computing devices 102, 108 may be implemented in a wired or wireless system. In some examples, the computing devices 102, 108 are implemented in devices within a vehicle, as further described below in conjunction with FIG. 2.

The receiver 104 of the retimer 103 of FIG. 1 receives analog serial data via the network 110 and converts the analog data into digital data to be processed by another component (e.g., a digital processor) of the corresponding computing device 102, 108. For example, the receiver 104 uses a clock and recovery protocol to convert analog data to digital data. The receiver 104 samples the received data using a clock signal. Also, the receiver 104 determines a phase difference between the clock used to sample the input data/received serial data and the clock used to convert the sampled data into a digital signal. The receiver 104 adjusts the clock signal used by an analog to digital converter responsive to the phase different so that the clock signal and the data signal are aligned without adding jitter to the data signal. The receiver 104 is further described below in conjunction with FIG. 3.

The transmitter 106 of the retimer 103 of FIG. 1 receives parallel data that is to be sent to another computing device and converts the parallel data into a single serial data stream using a clock generator. In some examples, the parallel data is from the receiver 104, after having converted serial data received from another device (e.g., a sensor) into the parallel data. The transmitter 106 includes serializer circuitry that serializes the parallel data responsive to a clock signal. The serial data is latched or gated responsive to a clock signal to so that the data is sampled and forwarded correctly. To avoid adding jitter to the data, the clock signal used by the serializer circuitry is adjusted responsive to a phase difference between the clock signal and the data signal. The adjusting of the clock signal used by the serializer circuitry aligns the clock signal and the data signal at the output of the transmitter 106. The transmitter 106 is further described below in conjunction with FIG. 4.

The example network 110 of FIG. 1 is a system of interconnected devices exchanging data. For example, the network 110 may be a shared interface or media such as an Ethernet connection, an FPD link, or a differential connection. In some examples, the network 110 represents a physical full-duplex interface that enables transmission and reception on the same connection using a single twisted pair cable. However, the network 110 may correspond to a different connection, e.g., a different wired or wireless connection.

Figure 2:
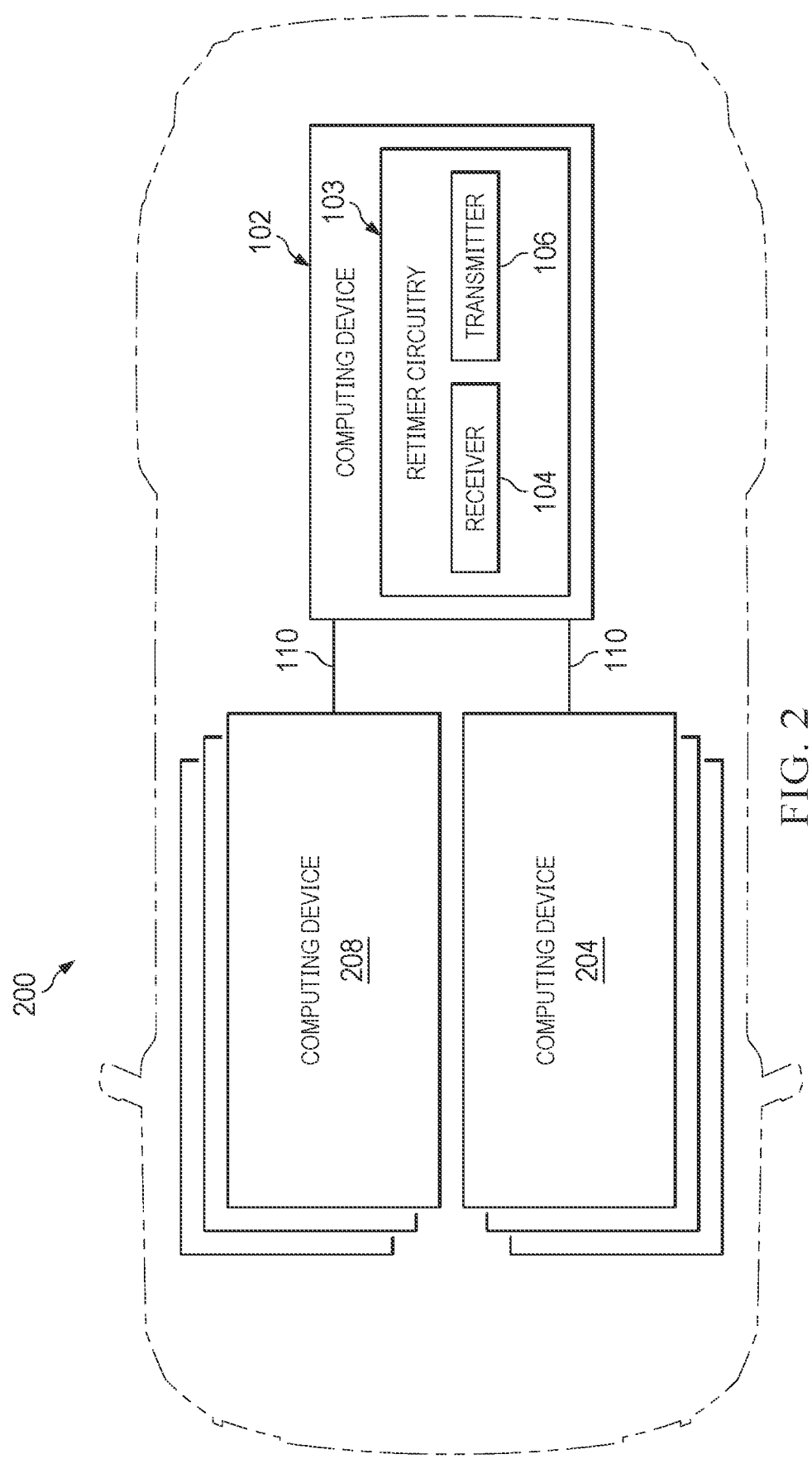
FIG. 2 is an example implementation of the example transmitters and receivers in a vehicle.

FIG. 2 illustrates an example vehicle 200 for implementing examples described herein. The example vehicle 200 includes computing devices 204, 208 connected via the computing device 102 which includes that retimer circuitry 103, using the network 110 (e.g., including a FPD link) of FIG. 1. Although FIG. 2 is described in conjunction with the retimer circuitry 103 implemented as a standalone computing device, the retimer circuitry 103 may be implemented in any computing device. Also, examples described herein could be implemented in any receiver or transmitter circuit that uses phase detection, including in the computing devices 204, 208. Also, only two computing devices 204, 208 are shown, but there may be additional such computing devices included in the vehicle 200.

In the example of FIG. 2, the computing device 204 may be a central computing device within an advanced driver-assistance system (ADAS), etc. The computing device 208 may be a camera, a sensor, a device in a lidar system, a central gateway, a display, an indicator, a speaker, a light, etc. In the example of FIG. 2, the retimer 103 may receive serial data from the computing device 204 via the network 110. Accordingly, the receiver circuitry 104 of the retimer 103 receives the serial data via the network 110 and converts the serial data to parallel data. After the serial data is converted to parallel data the transmitter 106 can convert the parallel data into serial data and provide the serial data to the computing device 208 via the network 110.

Figure 3:
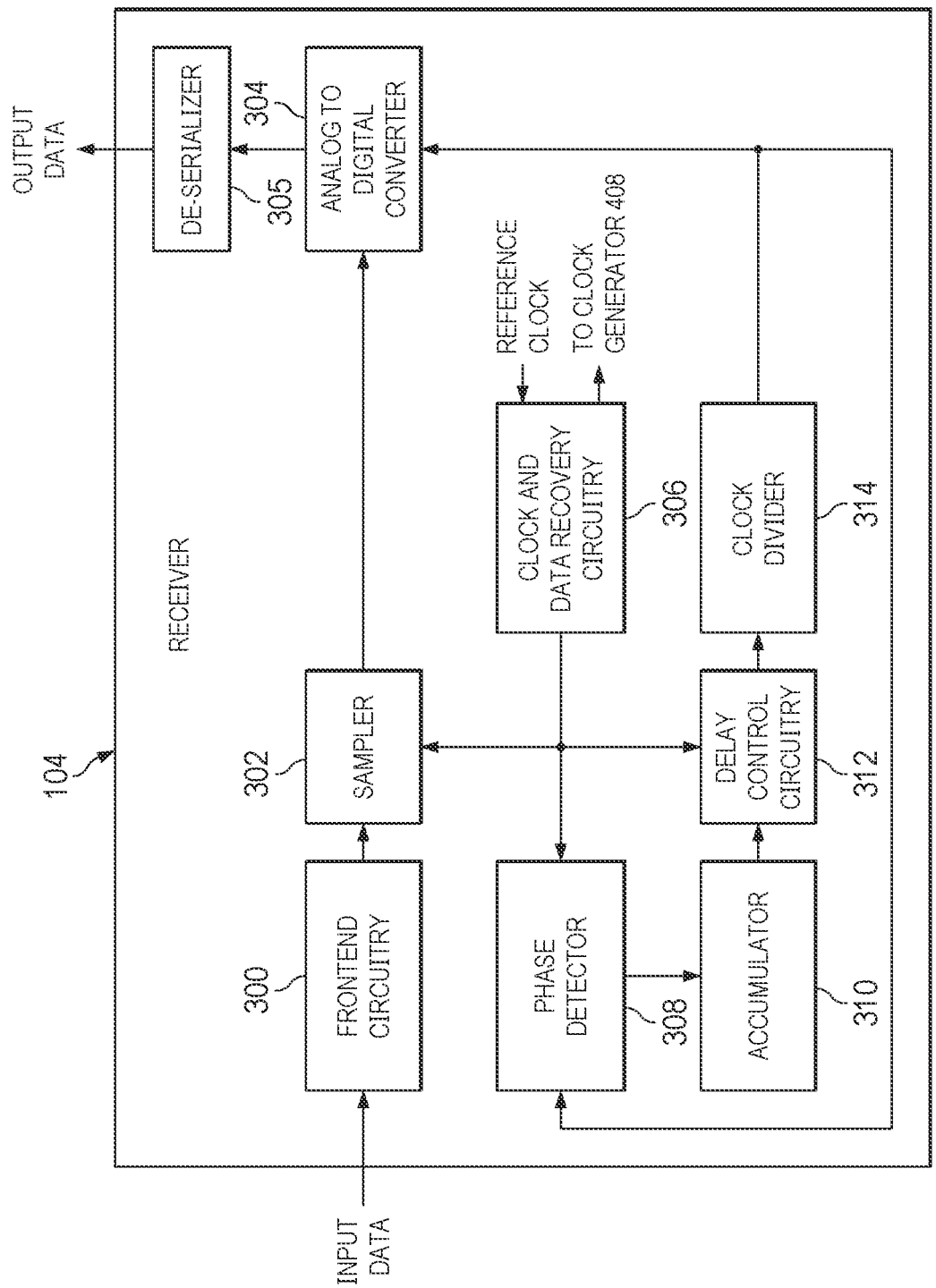
FIG. 3 is a block diagram of the receiver of FIGS. 1 and 2.

FIG. 3 is a block diagram of the receiver 104 of FIGS. 1 and 2. Although FIG. 3 is described in conjunction with the receiver 104 of FIGS. 1 and 2, FIG. 3 may be described in conjunction with any receiver circuitry. The example receiver 104 of FIG. 3 includes example frontend circuitry 300, example sampler circuitry 302, an example analog-to-digital converter (ADC) 304, example de-serializer circuitry 305, example clock and data recovery circuitry 306, example phase detector circuitry 308, example accumulator circuitry 310, example delay control circuitry 312, and example clock divider circuitry 314, each of which has at least one input and at least one output.

An input of the frontend circuitry 300 receives input data, e.g. serial data. An output of the frontend circuitry 300 is coupled to an input of the sampler circuitry 302. The sampler circuitry 302 includes two input terminals and an output terminal. The input terminal of the sampler circuitry 302 is coupled to the output terminal of the frontend circuitry 300. The second input terminal of the sampler 302 is coupled to the output terminal of the clock and data recovery circuitry 306. The output terminal of the sampler circuitry 302 is coupled to the analog to digital converter 304. The analog to digital converter 304 includes two input terminals and an output terminal. The first input terminal of the analog to digital converter 304 is coupled to the sampler circuitry 302. The second input terminal of the analog to digital converter 304 is coupled to the clock divider 314. The output terminal of the analog digital converter 304 is coupled to the deserializer circuitry 305. The deserializer circuitry 305 includes an input terminal and an output terminal. The input terminal of the deserializer circuitry 305 is coupled to the output terminal of the analog digital converter 304. The output terminal of the deserializer circuitry 305 is output to processing circuitry of the computing device and the transmitter of the computer device. The clock and data recovery circuitry 306 includes one input terminal and two output terminals. The input of the clock and data recovery circuitry 306 receives a reference clock signal. The first output terminal of the clock and data recovery circuitry 306 is coupled to the sampler circuitry 302, the phase detector circuitry 308, the delay control circuitry 312. The second output terminal of the clock and data recovery circuitry 306 is coupled to the clock generator circuitry 408 of FIG. 4. The phase detector circuitry 308 includes two input terminals and an output terminal. The first input terminal of the phase detector circuitry 308 is coupled to the clock and data recovery circuitry 306. The second input terminal of the phase detector 308 is coupled to the clock divider circuitry 314. The output terminal of the phase detector circuitry 308 is coupled to the accumulator circuitry 310. The accumulator circuitry 310 includes an input terminal and an output terminal. The input terminal of the accumulator circuitry 310 is coupled to the phase detector 308. The output terminal of the accumulator circuitry 308 is coupled to the delay control circuitry 312. The delay control circuitry through 12 includes two input terminals and an output terminal. The first input terminal of the delay control circuitry 312 is coupled to the accumulator circuitry 310. The second input terminal of the delay control circuitry 312 is coupled to the clock and data recovery circuitry 306. The output terminal of the delay control circuitry 312 is coupled to the clock device circuitry 314. The clock divider circuitry includes one input terminal and one output terminal. The input terminal of the clock divider circuitry 314 is coupled to the delay control circuitry 312. The output terminal of the clock divider circuitry 314 is coupled to the analog digital converter 304 and the phase detector 308.

In an example, the frontend circuitry 300 receives data via a FPD link of the network 110 of FIG. 1. The data may be serial data transmitted from a transmitter implemented in another computing device connected via the network 110. The frontend circuitry 300 provides the input data to the example sampler 302.

The sampler circuitry 302 of FIG. 3 samples the serial data from the frontend circuitry 300 responsive to a first clock signal provided by the clock and data recovery circuitry 306. In some examples, the sampler 302 can be implemented by a latch/gate that receives the serial data, and provides the serial data at different points in time responsive to the clock signal. To operate efficiently and without errors, the clock signal used by the sampler circuitry 302 and the clock signal (from the clock divider 314) used by the ADC 304 should be aligned. However, using a single clock signal for both may result in unaligned data due to the delay between the processing of the sampler circuitry 302 and the ADC 304. Thus, as further described below, the delay control circuitry 312 adjusts the clock signal used by the ADC 304 to improve the alignment of operation of the ADC 304 and the sampler circuitry 302. The sampler circuitry 302 provides the sampled data to the input of the ADC 304. The ADC 304 converts the sampled data from the sampler 302 to digital data responsive to a second, adjusted clock signal from the clock divider 314. The ADC 304 provides the digital data to the de-serializer circuitry 305. The de-serializer circuitry 305 converts the digital serial data into parallel data. In some examples, the transmitter circuitry 106 receives the parallel data and converts it to serial data to transmit to another device, as further described below.

The example clock and data recovery circuitry 306 of FIG. 3 generates a clean clock signal (e.g., the first clock signal) responsive to a reference clock signal (Ref Clock) from an oscillator or other clock generation circuitry of the retimer 103. For example, the clock and data recovery circuitry 306 may include a phase lock loop to generate the clock signal responsive to the reference clock signal. The clock and data recovery circuitry 306 provides the first clock signal to the sampler 302, the phase detector 308, and the delay control circuitry 312. In some examples, the clock and data recovery circuitry 306 generates a clean recovery clock signal responsive to the received input signal. As further described below, the phase detector 308 determines a phase difference between the clocking of the ADC 304 and gating or latching of the sampler 302. Responsive to the determined phase difference, the delay control circuitry 312 controls the clock divider 314 to adjust the second clock signal provided to the ADC 304 to reduce the phase difference. Also, as further described below in conjunction with FIG. 4, the clock and data recovery circuitry 306 provides the generated clock signal to the clock generator 408 of FIG. 4.

The example phase detector circuitry 308 of FIG. 3 determines a phase difference between the timing of the ADC 304 (e.g., corresponding to the second, adjusted clock signal) and the timing of the sampler 302 (e.g., corresponding to the first clock signal). The phase detector circuitry 308 includes integrator circuitry having switches (e.g., controlled by the first clock signal) and a capacitor to average differential dummy data (e.g., corresponding to the second, adjusted clock signal) and a comparator to compare the averages (e.g., periodically) to generate an output signal corresponding to phase differences at different points in time. The phase detector 308 provides an output signal (e.g., value) corresponding to the phase differences to the accumulator 310. The accumulator 310 determines the final phase output value responsive to a threshold number of output values from the comparator of the phase detector circuitry 308. The phase detector 308 and the accumulator 310 are further described below in conjunction with FIG. 5.

The delay control circuitry 312 of FIG. 3 receives the clock signal from the clock generator circuitry 306 and a value representative of a phase difference between the first clock signal used by the sampler 302 and the second clock signal used by the ADC 304. The delay control circuitry 312 determines how to adjust the first clock signal from the clock and data recovery circuitry 306 to reduce the phase responsive to the first clock signal and the output signal of the accumulator circuitry 310. The delay control circuitry 312 provides the first clock signal and a value corresponding to how to adjust the first clock signal to the clock divider 314. The clock divider 314 can adjust the first clock signal to generate a second clock signal that reduces the phase difference.

Figure 4:
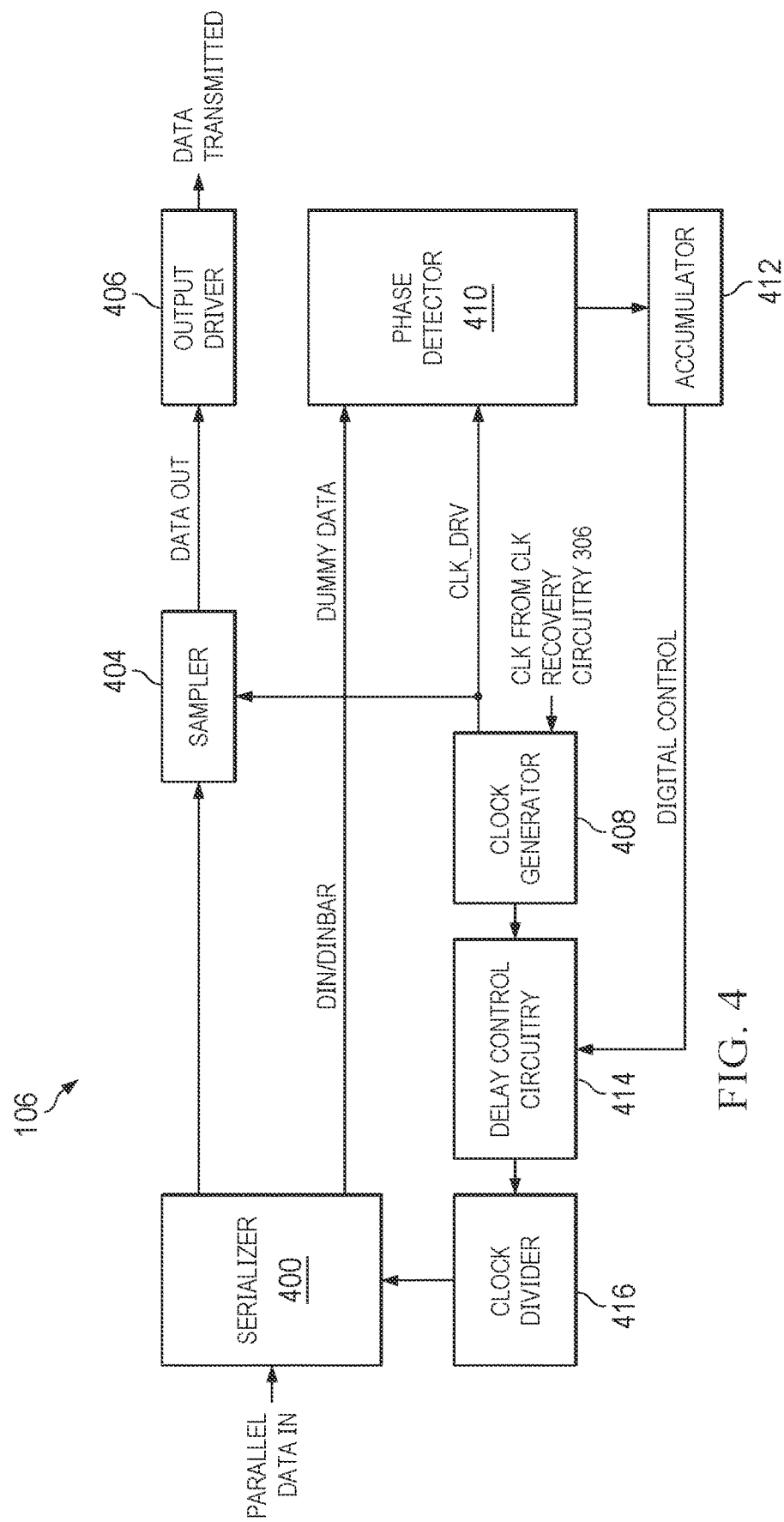
FIG. 4 is a block diagram of the transmitter of FIGS. 1 and 2.

FIG. 4 is a block diagram of the transmitter 106 of FIGS. 1 and 2. Although FIG. 4 is described in conjunction with the transmitter 106 of FIGS. 1 and 2, FIG. 4 may be described in conjunction with any transmitter circuitry. The example transmitter 106 of FIG. 4 includes example serializer circuitry 400, example sampler circuitry 404, example output driver circuitry 406, example clock generation circuitry 408, an example phase detector circuitry 410, example accumulator circuitry 412, example delay control circuitry 414, and example clock driver circuitry 416.

An input of the serializer circuitry 400 receives input data, e.g. parallel data. Also, a second input of the serializer circuitry 400 is coupled to the clock divider circuitry 416. An output of the serializer circuitry 400 is coupled to an input of the sampler circuitry 404. A second output of the serializer circuitry 400 is coupled to an input of the phase detector circuitry 410. The sampler circuitry 404 includes two input terminals and an output terminal. The input terminal of the sampler circuitry 404 is coupled to the output terminal of the serializer circuitry 400. The second input terminal of the sampler 404 is coupled to the output terminal of the clock generator circuitry 408. The output terminal of the sampler circuitry 404 is coupled to the analog to output driver 406. The output driver 406 includes an input terminal and an output terminal. The input terminal of the output driver 406 is coupled to the sampler circuitry 404. The output terminal of the analog digital converter 304 outputs an output signal via the network 110. The clock generator circuitry 408 includes an input terminal and two output terminals. The input terminal of the clock generator circuitry 408 is coupled to the clock and recovery circuitry 306 of FIG. 3. The first output terminal of the clock generator circuitry 408 is coupled to the sampler circuitry 404 and the phase detector circuitry 410. The second output terminal of the clock generator circuitry 408 is coupled to the delay control circuitry 414. In some examples, the first and second output terminals of the clock generation circuitry 410 may be the same terminal. The phase detection circuitry 410 includes two input terminals and an output terminal. The first input terminal of the phase detection circuitry 410 is coupled to the serializer circuitry 400. The second input terminal of the phase detection circuitry 410 is coupled to the clock generation circuitry 408. The output terminal of the phase detection circuitry 410 is coupled to the accumulator 412. The accumulator 412 includes an input terminal and an output terminal. The input terminal of the accumulator 412 is coupled to the phase detector circuitry 410. The output terminal of the accumulator 412 is coupled to the delay control circuitry 414. The delay control circuitry 414 includes two input terminals and an output terminal. The first input terminal of the delay control circuitry 414 is coupled to the clock generation circuitry 408. The second input terminal of the delay control circuitry 414 is coupled to the accumulator 412. The output terminal of the delay control circuitry 414 is coupled to the clock divider circuitry 416. The clock divider circuitry 416 include an input terminal and an output terminal. The input terminal of the clock divider circuitry 416 is coupled to the delay control circuitry 414. The output terminal of the clock divider circuitry 416 is coupled to the serializer circuitry 400.

The example serializer circuitry 400 of FIG. 4 receives parallel input data streams from the receiver circuitry 104. In some examples, the serializer circuitry 400 receives the parallel input data streams from a digital processor. The serializer circuitry 400 converts the input parallel data into serial data responsive to a clock signal. The serial data may be differential data where the serializer circuitry 400 provides two output signals (e.g., where one signal is differential to the second signal). As further described below, the clock signal is a second clock signal that has been adjusted from a first clock signal generated by the clock generator circuitry 408. The clock signal is adjusted so that the output data aligns with the clock signal used by the sampler 404. Also, the serializer circuitry 400 provides dummy differential data (e.g., DIN and DINBAR) to the phase detector 410. The dummy data path to the phase detector 410 corresponds to (e.g., mimics) the data path delay in the serializer circuitry 400, so that the phase detector 410 can work with the dummy data as an alias for the actual data going from the serializer 400 to the sampler 402, as further described below. The dummy data can be a sequence of '0's and '1's (e.g., 010101 . . . ) that transitions between the two values responsive to the second clock signal provided by the clock divider 416. The dummy bar data is the opposite of the dummy data. For example, if the dummy data is '0,' the dummy bar data is '1' and vice versa. Accordingly, if the dummy data is '010101 . . . " the dummy bar data will be "101010 . . . " In some examples, the sterilizer circuitry 400 provides the dummy data and an inverter is used to generate the dummy bar data. The dummy differential data is provided to the phase detector 410 responsive to the second clock signal (e.g., the same clock signal that the serializer circuitry 400 uses to provide the serial output data). In this manner, the phase detector circuitry 410 can determine a phase difference between the first clock signal used by the sampler 404 and the second clock signal used by the serializer circuitry 400 based on the dummy data, as further described below.

The sampler circuitry 404 of FIG. 4 samples the serial data according to a first clock signal provided by the clock generation circuitry 408. In some examples, the sampler 404 can be implemented by a latch/gate that receives the serial data, and provides the serial data at different points in time responsive to the clock signal. To operate efficiently and without errors, the clock signal used by the sampler circuitry 404 and the clock signal used by the serializer circuitry 400 should be aligned. However, using a single clock signal for both may result in unaligned data due to the delay between the processing of the serializer circuitry 400 and the sampler 404. Thus, as further described below, the delay control circuitry 414 adjusts the clock signal from the clock generation circuitry 408 to improve the alignment of operation of the serializer circuitry 400 and the sampler 404. The sampler 404 provides the sampled data to the output driver 406 to transmit the output data to another computing device via the network 110.

The example clock generation circuitry 408 of FIG. 4 generates a clock signal (e.g., the first clock signal) responsive to the clock signal provided by the clock and data recovery circuitry 306. For example, the clock generation circuitry 408 may include a flop circuitry to synchronize with the clock/data associated with the receiver 104 to generate the clock signal. The clock generation circuitry 408 provides the first clock signal to the sampler 404, the phase detector 410, and the delay control circuitry 414. As further described below, the phase detector 410 determines a phase difference between the clocking of the serializer circuitry 400 and gating or latching of the sampler 404 and the delay control circuitry 414 controls the clock divider 416 to adjust the second clock signal used by the serializer circuitry 400 to reduce the phase difference.

The example phase detector circuitry 410 of FIG. 4 determines a phase difference between the timing of the serializer circuitry 400 (e.g., corresponding to the second, adjusted clock signal) and the timing of the sampler 404 (e.g., corresponding to the clock signal). The phase detector circuitry 410 includes integrator circuitry having switches (e.g., controlled by the first clock signal) and a capacitor to average the differential dummy data (e.g., corresponding to the second, adjusted clock signal) and a comparator to compare the averages (e.g., periodically) to generate an output signal corresponding to a phase differences at different points in time. The phase detector 410 provides the output signal (e.g., a value) corresponding to the phase differences to the accumulator 412. The accumulator 412 determines the final phase output value responsive to a threshold number of output values from the comparator of the phase detector circuitry 410. The phase detector 410 and the accumulator 412 are further described below in conjunction with FIG. 5.

The delay control circuitry 414 of FIG. 4 receives the clock signal from the clock generator circuitry 408 and a value representative of a phase difference between the first clock signal used by the sampler 404 and the second clock signal used by the serializer circuitry 400. The delay control circuitry 414 determines how to adjust the first clock signal from the clock generation circuitry 408 to reduce the phase responsive to the first clock signal and the output signal of the accumulator circuitry 412. The delay control circuitry 414 provides the first clock signal and a value corresponding to how to adjust the first clock signal to the clock divider 416 so the clock divider 416 can adjust the first clock signal to generate a second clock signal that reduces the phase difference.

Figure 5:
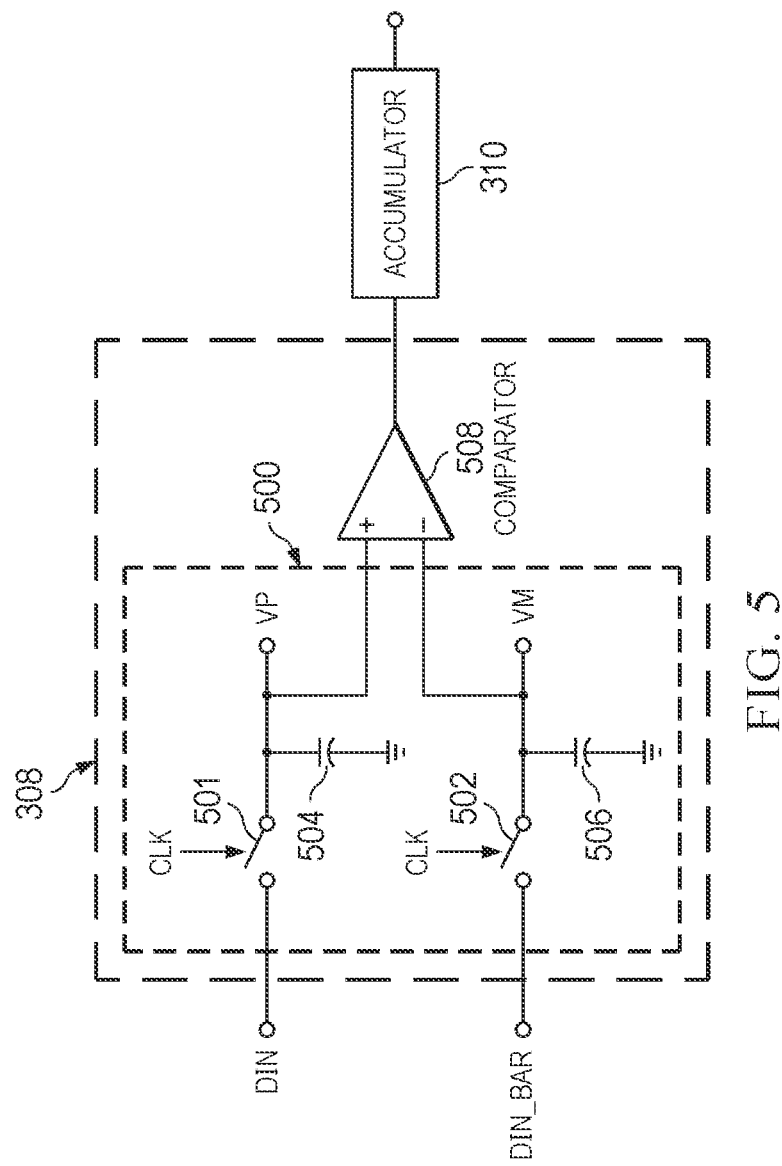
FIG. 5 is a circuit implementation of phase detection circuitry of FIG. 3 or FIG. 4.

FIG. 5 is an example circuit implementation of the phase detector circuitry 410 of FIG. 4. However, FIG. 5 could also implement the phase detector circuitry 308 and accumulator 310 within the receiver 104 of FIG. 3. The phase detector circuitry 410 includes example integration circuitry 500, which include example switches 501, 502 and example capacitors 504, 506, and an example comparator 508. FIG. 5 further includes the example accumulator 412 of FIG. 4.

The integrator circuitry 500 of FIG. 5 integrates and averages the dummy data and differential dummy data based on a clock signal from the clock generator circuitry 408. As described above in conjunction with FIG. 4, the dummy data path to the phase detector 410 corresponds to (e.g., mimics) the data path delay in the serializer circuitry 400, so that the phase detector 410 can work with the dummy data as an alias for the actual data going from the serializer 400 to the sampler 402, as further described below. The dummy data can be a sequence of '0's and '1's (e.g., 010101 . . . ) that transitions between the two values responsive to the second clock signal provided by the clock divider 416. The dummy bar data is the opposite of the dummy data. For example, if the dummy data is '0,' the dummy bar data is '1' and vice versa. Accordingly, if the dummy data is '010101 . . . " the dummy bar data will be "101010 . . . " The integrator circuitry 500 includes four input terminals and two output terminals. The first input terminal (e.g., a dummy input terminal or DIN) of the integrator circuitry 500 is coupled to a first output terminal (e.g., the dummy output terminal) of the serializer circuitry 400 of FIG. 4. The second input terminal (e.g., a differential dummy input terminal DIN-BAR) of the integrator circuitry 500 is coupled to a second output terminal (e.g., the differential dummy output terminal) of the serializer circuitry 400. The third and fourth input terminals of the integrator circuitry 500 are coupled to the output terminal of the clock generator circuitry 408. The first output terminal (e.g., voltage plus (VP) terminal) of the integrator circuitry 500 is coupled to a first input terminal (e.g., a non-inverting input terminal) of the comparator 508. The second output terminal (e.g., voltage minus (VM) terminal) of the integrator circuitry 500 is coupled to a second input terminal (e.g., the inverting input terminal) of the comparator 508. The integrator circuitry 500 integrates the dummy signal based on the clock signal to generate an average voltage that corresponds to a phase difference between the first clock signal provided by the clock generation circuitry 408 and the second clock signal input into the serializer circuitry 400. If the two signal are aligned, the voltage provided by the integrator 500 at the first output terminal will average to the supply voltage (Vdd) divided by 2 and the voltage provided by the integrator 500 at the second output terminal will average to the supply voltage divided by 2. If the signals are unaligned, the voltage provided by the integrator 500 at the first output terminal will average to the above or below supply voltage (Vdd) divided by 2 and the voltage provided by the integrator 500 at the second output terminal will average to below or above the supply voltage divided by 2. In the example of FIG. 5, the integrator is implemented by an resistor capacitor (RC) circuit using the switches 501, 502 (e.g., corresponding to resistances) and the capacitors 504, 506.

The switch 501 of FIG. 5 corresponds to a resistance in the RC circuit for the integrator 500 and is controlled by the clock signal provided by the clock generation circuitry 408. In some examples, the switch 501 is implemented by a transistor (e.g., a metal oxide semiconductor field effect transistor (MOSFET)). The switch 501 includes a first current terminal, a second current terminal, and a control terminal. The first current terminal (e.g., a dummy input terminal or DIN) of the switch 501 is coupled to a first output terminal (e.g., the dummy output terminal) of the serializer circuitry 400 of FIG. 4. The second current terminal (e.g., at the VP node) of the switch 501 is coupled to a first terminal of the capacitor 504 and the first input terminal (e.g., the non-inverting input terminal) of the comparator 508. The control terminal is coupled to the output terminal of the clock generation circuitry 408. The clock signal from the clock generation circuitry 408 toggles between a high voltage (e.g., '1') and a low voltage ('0') to enable and disable the switch responsive to the clock signal. After the switch 501 is enabled, the voltage from the dummy signal is used to charge or discharge the capacitor 504. For example, if the switch 501 is enabled and the dummy data is a high voltage (e.g., '1'), the high voltage from the dummy data charges the capacitor 504, thereby increasing the voltage at the VP node. IF the switch 501 is enabled and the dummy data is a low voltage (e.g., '0'), the low voltage from the dummy data causes the capacitor 504 to discharge toward ground, thereby lowering the voltage at the VP node. If the switch 501 is disabled, the charge stored in the capacitor 504 is maintained, causing the voltage at the VP node to remain stable until the switch 501 is enabled.

The switch 502 of FIG. 5 corresponds to a resistance in the RC circuit for the integrator 500 and is controlled by the clock signal provided by the clock generation circuitry 408. In some examples, the switch 502 is implemented by a transistor (e.g., a metal oxide semiconductor field effect transistor (MOSFET)). The switch 502 includes a first current terminal, a second current terminal, and a control terminal. The first current terminal (e.g., a dummy input terminal or DIN) of the switch 502 is coupled to a second output terminal (e.g., the dummy bar output terminal) of the serializer circuitry 400 of FIG. 4. The second current terminal (e.g., at the VM node) of the switch 502 is coupled to a first terminal of the capacitor 506 and the first input terminal (e.g., the inverting input terminal) of the comparator 508. The control terminal is coupled to the output terminal of the clock generation circuitry 408. The clock signal from the clock generation circuitry 408 toggles between a high voltage (e.g., '1') and a low voltage ('0') to enable and disable the switch responsive to the clock signal. If the switch 502 is enabled, the voltage from the dummy bar signal is used to charge or discharge the capacitor 506. For example, if the switch 502 is enabled and the dummy bar data is a high voltage (e.g., '1'), the high voltage from the dummy bar data charges the capacitor 506, thereby increasing the voltage at the VM node. If the switch 502 is enabled and the dummy bar data is a low voltage (e.g., '0'), the low voltage from the dummy data causes the capacitor 506 to discharge toward ground, thereby lowering the voltage at the VM node. If the switch 502 is disabled, the charge stored in the capacitor 506 is maintained, causing the voltage at the VM node to remain stable until the switch 502 is enabled.

The example capacitor 504 of FIG. 5 stores a change responsive to the dummy signal and the clock signal from the clock generator circuitry 408. The capacitor 504 includes two terminals. The first terminal (e.g., at the VP node) of the capacitor 504 is coupled to the second current terminal of the switch 501 and the first input terminal (e.g., the non-inverting input terminal) of the comparator 508. The second terminal of the capacitor 504 is coupled to ground. As described above, the voltage at the VP node is responsive to the charge stored in the capacitor 504.

The example capacitor 506 of FIG. 5 stores a change responsive to the dummy bar signal and the clock signal from the clock generator 408. The capacitor 506 includes two terminals. The first terminal (e.g., at the VM node) of the capacitor 506 is coupled to the second current terminal of the switch 502 and the second input terminal (e.g., the inverting input terminal) of the comparator 508. The second terminal of the capacitor 506 is coupled to ground. As described above, the voltage at the VM node is responsive to the charge stored in the capacitor 506.

The comparator 508 of FIG. 5 compares the voltage at the VP node to the voltage at the VM node. The comparator 508 includes two input terminals and an output terminal. The first input terminal (e.g., the non-inverting input terminal at the VP node) of the comparator 508 is coupled to the second current terminal of the switch 501 and the first terminal of the capacitor 504. The second input terminal (e.g., the inverting input terminal at the VM node) of the comparator 508 is coupled to the second current terminal of the switch 502 and the first terminal of the capacitor 506. The output terminal of the comparator 508 is coupled to the input terminal of the accumulator 216. The comparator 508 generates an output signal responsive to the comparison of the voltage at the VP node to the voltage at the VM node. For example, if the voltage at the VP node is above the voltage at the VM node, the comparator 508 will output a high voltage (e.g., Vdd or '1'). In some examples, the comparator 508 generates an output comparison signal responsive to a clock signal. Thus, the comparator 508 can provide comparison results to the accumulator 216 responsive to the clock signal. The frequency of the clock signal needs to be high enough to account for positive and negative voltage dips responsive to whether the switches 501, 502 are enabled. For example, a positive glitch occurs at the VP node while the dummy signal transitions from '1' to '0' and a negative glitch occurs at the VP node while the dummy signal transitions from '0' to '1.' However, as further described below in conjunction with FIG. 6, the frequency of the clock signal can be reduced by implementing a second set of switches to avoid one of the glitches (e.g., either the positive glitches or the negative glitches). If the voltage at the VP node is below the voltage at the VM node, the comparator 508 will output a low voltage (e.g., 0 V or '0'). The output signal of the comparator 508 is transmitted to the accumulator 216.

The example accumulator circuitry 216 of FIG. 5 accesses output comparisons of the comparator 508 to determine whether the clock signals are aligned or misaligned. The accumulator circuitry 216 includes an input terminal and an output terminal. The input terminal of the accumulator circuitry 216 is coupled to the output terminal of the comparator 508 and the output terminal of the accumulator 216 is coupled to the delay control circuitry 414. The accumulator 216 determines whether the clock signals (e.g., the first clock signal used by the sampler circuitry 404 and the second clock signal used by the serializer circuitry 400) are aligned or not. For example, if less than a threshold number of output comparisons correspond to a '0,' the accumulator 216 may determine that the clock signals are aligned and, if more than the threshold number of output comparisons correspond to a '1,' the accumulator 216 may determine that the clock signals are unaligned. If the accumulator 216 provides a signal to the example delay control circuitry 414 indicative of the alignment of the clocks. In this manner, the delay control circuitry 414 can control the clock divider 416 to adjust the second clock signal used by the serializer circuitry 400 to compensate for the unalignment, if any. Example timing diagrams corresponding to the phase detector circuitry 410 of FIG. 5 are further described below in conjunction with FIGS. 7A and 7B.

Although the example of FIG. 5 is described in conjunction with the phase detector 410 of FIG. 4, FIG. 5 may be described in conjunction with the phase detector 308 of FIG. 4. For example, instead of using the dummy data (e.g., DIN and DIN_BAR) from the serializer 400, the phase detector 308 utilizes the clock signal input into analog-to-digital converter 304 (e.g., the clock signal provided by the clock divider 314). For example, the DIN input signal of FIG. 5 can be replaced with the clock signal provided by the clock divider 314 and the DIN_BAR can be replaced with a differential clock signal (e.g., opposite of the clock signal provided by the clock divider 314). In some examples, the clock divider 314 provides the differential clock signal. In some examples, an inverter (not shown) can be implemented to generate the differential clock signal responsive to the clock signal. In this manner, the capacitors 504, 506 can be charged responsive to the clock signals from the clock generator 306 (e.g., used to control the switches 501, 502) and the clock signal from the clock divider 314.

Figure 6:
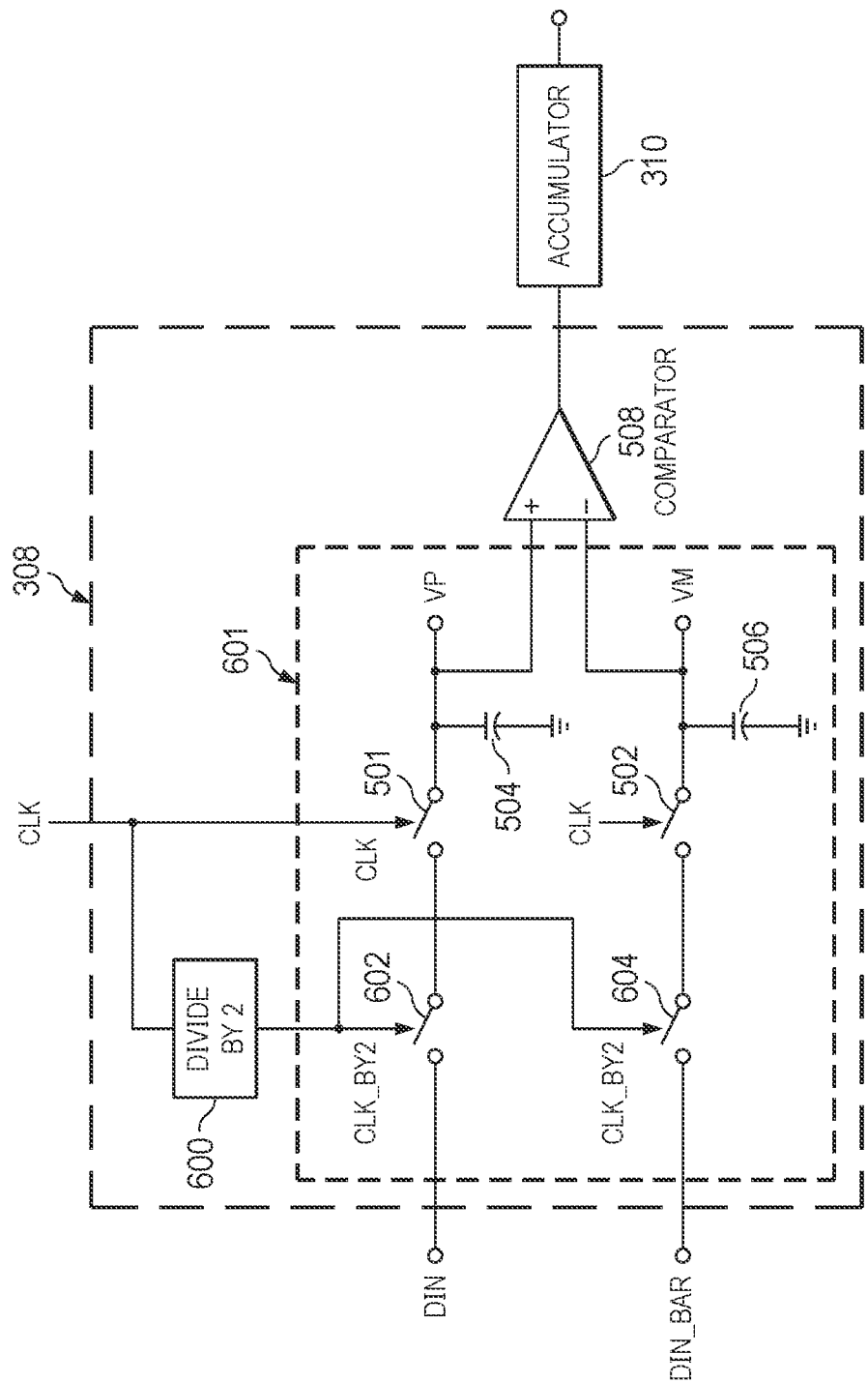
FIG. 6 is an alternative circuit implementation of phase detection circuitry of FIG. 3 or FIG. 4.

FIG. 6 is an alternative example circuit implementation of the phase detector circuitry 410 of FIG. 4. However, FIG. 6 could also implement the phase detector circuitry 308 and accumulator 310 within the receiver 104 of FIG. 3. The phase detector circuitry 410 includes example divider circuitry 600 and example alternative integrator circuitry 601. The example alternative integrator circuitry 601 includes the switches 501, 502, the capacitors 504, 506, and the comparator 508 of FIG. 5. The example alternative integrator circuitry 601 further includes the example switches 602, 604.

The divider circuitry 600 of FIG. 6 divides the clock signal (e.g., by two) from the example clock signal generation circuitry 408 to double the period of the clock signal. The divider circuitry 600 includes an input terminal and an output terminal. The input terminal is coupled to the clock generation circuitry 408 and the output terminal is coupled to the control terminals of the switches 602, 604. As further described below, the divider circuitry 600 generates the clock signal with the longer period to control (e.g., enable or disabled), the switches 602, 604.

The alternative integrator circuitry 601 of FIG. 6 includes the two switches 602, 604, controlled by a clock signal with a doubled period to remove one of the positive or negative voltage glitches that occur while the switches 501, 502 are enabled. The alternative integrator circuitry 610 includes an additional input terminal to the input terminals the integrator circuitry 500 of FIG. 5. The additional input terminal of the alternative integrator circuitry 610 is coupled to the output terminal of the divider circuitry 600. Because the alternative integrator circuitry 601 enables the switches 602, 604 according to a different frequency than the switches 501, 502, the comparator 508 can be sampled at a lower frequency while maintaining phase detection accuracy, thereby further reducing the amount of resources needed to detect a phase difference.

The switch 602 of FIG. 6 enables or disables responsive to the clock signal from the divider circuitry 600 to cause the dummy signal to charge or discharge the capacitor 504. The switch 602 includes a first current terminal, a second current terminal, and a control terminal. The first current terminal of the switch 602 is coupled to the serializer circuitry 400 of FIG. 4 at the DIN node. The second current terminal of the switch 602 is coupled to the first current terminal of the switch 501. The control terminal of the switch 602 is coupled to the output terminal of the divider circuitry 600.

The switch 604 of FIG. 6 enables or disables responsive to the clock signal from the divider circuitry 600 to cause the dummy bar signal to charge or discharge the capacitor 506. The switch 604 includes a first current terminal, a second current terminal, and a control terminal. The first current terminal of the switch 604 is coupled to the serializer circuitry 400 of FIG. 4 at the DIN_BAR node. The second current terminal of the switch 604 is coupled to the first current terminal of the switch 502. The control terminal of the switch 604 is coupled to the output terminal of the divider circuitry 600. Example timing diagrams corresponding to the phase detector circuitry 410 of FIG. 6 are further described below in conjunction with FIGS. 8A and 8B.

Although the example of FIG. 6 is described in conjunction with the phase detector 410 of FIG. 4, FIG. 6 may be described in conjunction with the phase detector 308 of FIG. 3. For example, instead of using the dummy data (e.g., DIN and DIN_BAR) from the serializer 400, the phase detector 308 utilizes the clock signal input into analog-to-digital converter 304 (e.g., the clock signal provided by the clock divider 314). For example, the DIN input signal of FIG. 6 can be replaced with the clock signal provided by the clock divider 314 and the DIN_BAR can be replaced with a differential clock signal (e.g., opposite of the clock signal provided by the clock divider 314). In some examples, the clock divider 314 provides the differential clock signal. In some examples, an inverter (not shown) can be implemented to generate the differential clock signal responsive to the clock signal. In this manner, the capacitors 504, 506 can be charged based on the clock signals from the clock generator 306 (e.g., used to control the switches 501, 502 602, 604) and the clock signal from the clock divider 314.

Figure 7A:
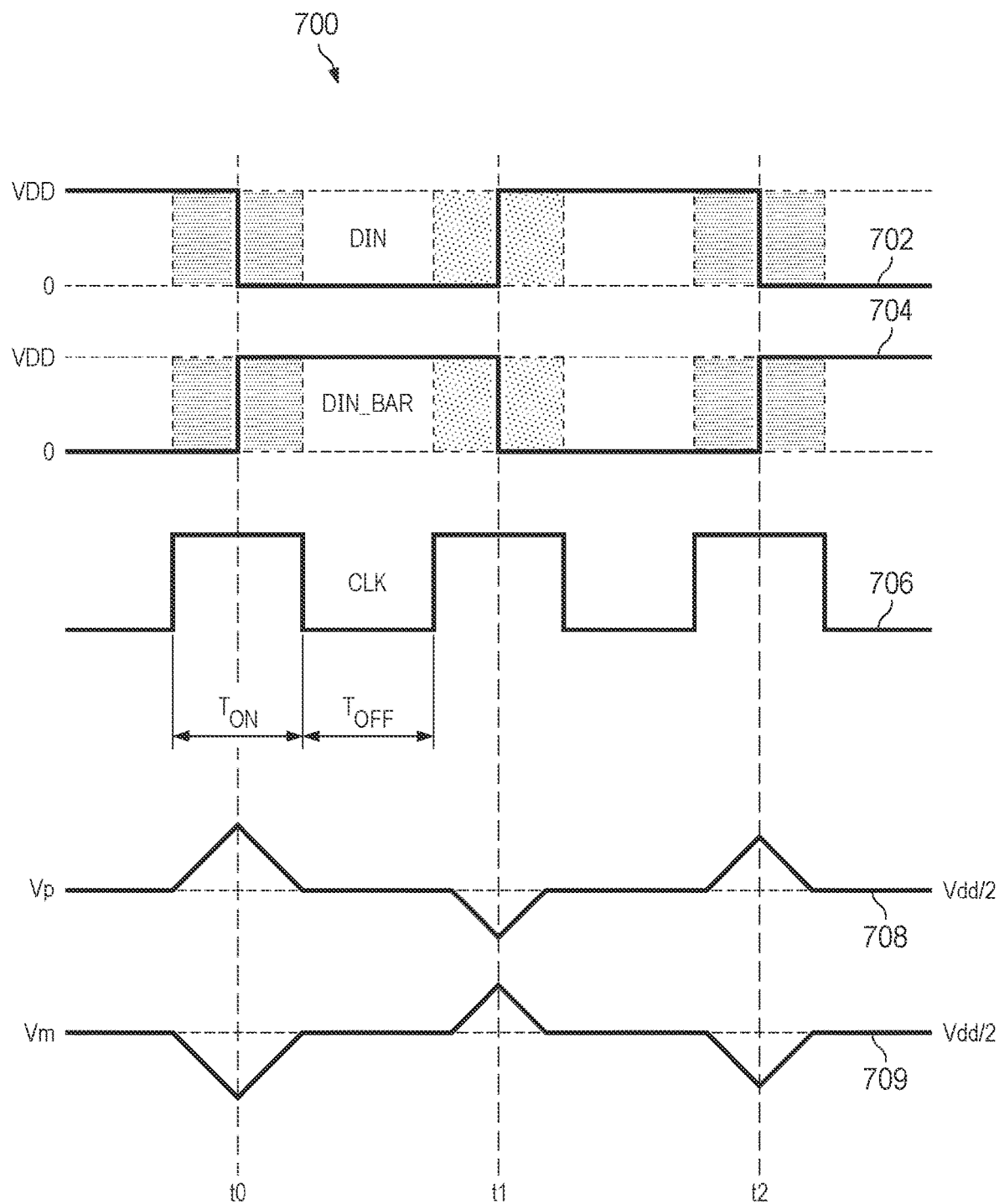
FIGS. 7A-8B illustrate timing diagrams in conjunction with the phase detection circuitry of FIGS. 5 and 6.

FIG. 7A is an example timing diagram 700 of signals corresponding to the phase detector circuitry 410 of FIG. 5 while the clock signals in the receiver or transmitter are aligned. The example timing diagram 700 includes an example DIN signal 702, an example DIN_BAR signal, an example clock signal 706, an example VP signal 708, and an example VM signal 709. The DIN signal 702 corresponds to a dummy signal provided by the example serializer circuitry 400 of FIG. 4 or the ADC 304 of FIG. 3. The DIN_BAR signal 704 corresponds to the dummy bar signal provided by the example serializer circuitry 400 or the ADC 304. The clock signal 706 corresponds to the clock signal provided by the clock and data recovery circuitry 306, 408 of FIGS. 3 and 4. The VP signal 708 corresponds to the voltage at the VP node of FIG. 5. The VM signal 709 corresponds to the voltage at the VM node of FIG. 5.

During the first pulse of the clock signal 706, if the switches 501, 502 are enabled, the dummy signal 702 is high and the dummy bar signal 704 is low. Thus, the dummy signal 702 charges the capacitor 504 to increase the VP signal 708 and the dummy bar signal 704 discharges the capacitor 506 to decrease the VM signal 709. At time t0, the dummy signal 702 drops to a low voltage and the dummy bar signal 704 goes to a high voltage. Thus, the dummy signal 702 discharges the capacitor 504 to decrease the VP signal 708 and the dummy bar signal 704 charges the capacitor 506 to increase the VM signal 709. If the clock signal 706 goes to a low voltage, the switches 501, 502 are disabled and the capacitors 504, 506 hold the charge (e.g., Vdd/2) until the switches 501, 502 are enabled again.

During the second pulse of the clock signal 706, if the switches 501, 502 are enabled, the dummy signal 702 is low and the dummy bar signal 704 is high. Thus, the dummy signal 702 discharges the capacitor 504 to decrease the VP signal 708 and the dummy bar signal 704 charges the capacitor 506 to increase the VM signal 709. At time t1, the dummy signal 702 goes to a high voltage and the dummy bar signal 704 decreases to a low voltage. Thus, the dummy signal 702 charges the capacitor 504 to increase the VP signal 708 and the dummy bar signal 704 discharges the capacitor 506 to decrease the VM signal 709. If the clock signal 706 goes to a low voltage, the switches 501, 502 are disabled and the capacitors 504, 506 hold the charge (e.g., Vdd/2) until the switches 501, 502 are enabled again.

As described above, the comparator 508 periodically (e.g., responsive to a clock pulse) compares the VP signal 708 to the VM signal 709 and generates output values based on comparisons. The accumulator 412 accumulates a threshold number of comparisons to determine whether the clock signals are aligned or misaligned. In the example, of FIG. 7A, the clock signals are aligned. However, FIG. 7B illustrates another example where the clock signals are unaligned.

Figure 7B:
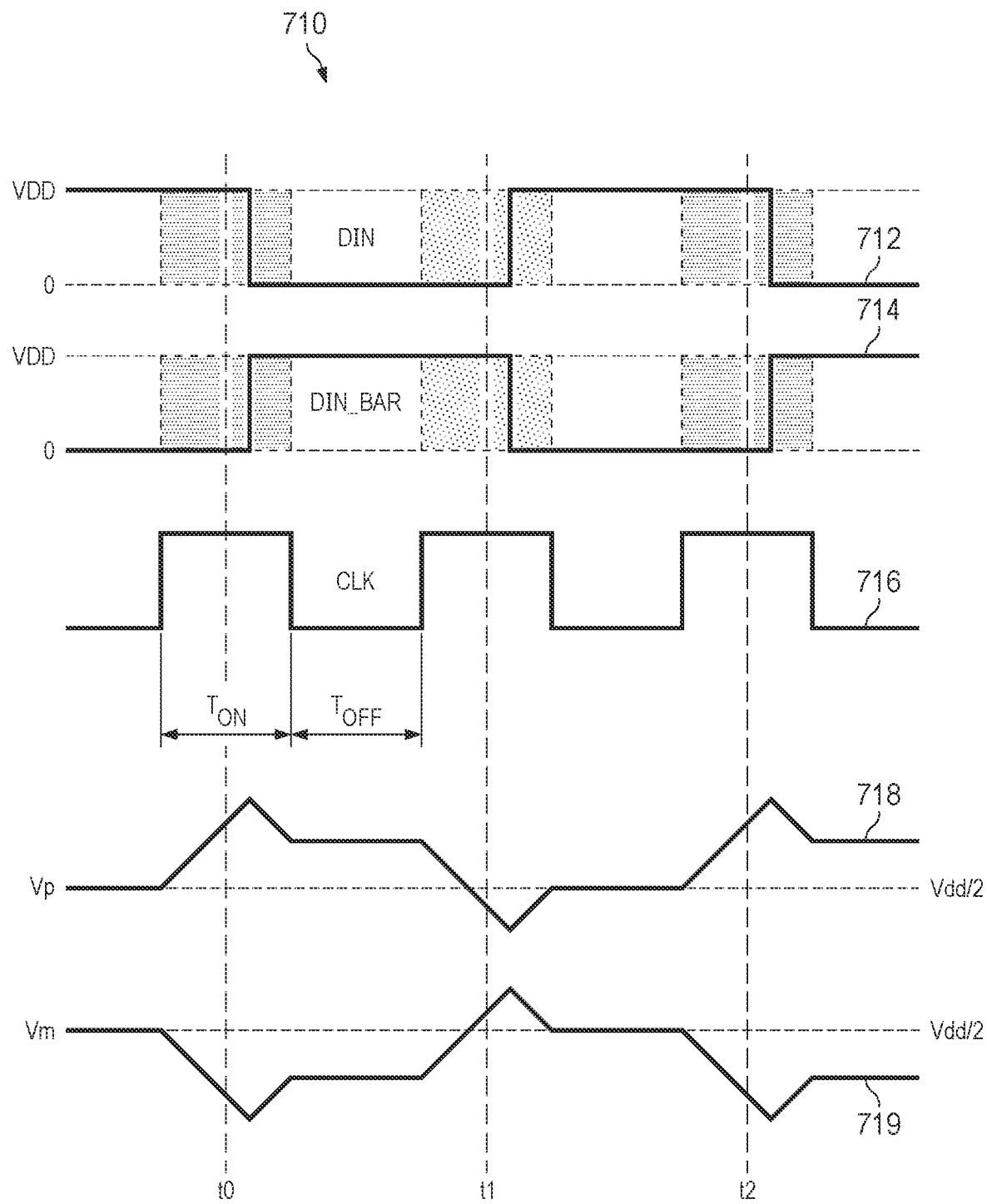

FIG. 7B is an example timing diagram 710 of signals corresponding to the phase detector circuitry 410 of FIG. 5 while the clock signals in the receiver or transmitter are unaligned. The example timing diagram 710 includes an example DIN signal 712, an example DIN_BAR signal, an example clock signal 716, an example VP signal 718, and an example VM signal 719. The DIN signal 712 corresponds to a dummy signal provided by the example serializer circuitry 400 of FIG. 4 or the ADC 304 of FIG. 3. The DIN_BAR signal 714 corresponds to the dummy bar signal provided by the example serializer circuitry 400 or the ADC 304. The clock signal 716 corresponds to the clock signal provided by the clock and data recovery circuitry 306, 408 of FIG. 3 or 4. The VP signal 718 corresponds to the voltage at the VP node of FIG. 5. The VM signal 719 corresponds to the voltage at the VM node of FIG. 5.

During the first pulse of the clock signal 716, if the switches 501, 502 are enabled, the dummy signal 712 is high and the dummy bar signal 714 is low. Thus, the dummy signal 712 charges the capacitor 504 to increase the VP signal 718 and the dummy bar signal 714 discharges the capacitor 506 to decrease the VM signal 719. For a duration of time after time t0, the dummy signal 715 is still high and the dummy bar signal 714 is still low, thereby causing the VP signal 718 to keep increasing and the VM signal 719 to keep decreasing. At a point in time after t0, the dummy signal 712 drops to a low voltage and the dummy bar signal 714 goes to a high voltage. Thus, the dummy signal 712 discharges the capacitor 504 to decrease the VP signal 718 and the dummy bar signal 714 charges the capacitor 506 to increase the VM signal 719. If the clock signal 716 goes to a low voltage, the switches 501, 502 are disabled and the capacitors 504, 506 hold the charge (e.g., a voltage above Vdd/2 for the VP signal 718 and a voltage below VDD/2 for the VM signal 719) until the switches 501, 502 are enabled again.

During the second pulse of the clock signal 716, while the switches 501, 502 are enabled, the dummy signal 712 is low and the dummy bar signal 714 is high. Thus, the dummy signal 712 discharges the capacitor 504 to decrease the VP signal 718 and the dummy bar signal 714 charges the capacitor 506 to increase the VM signal 719. For a duration of time after time t1, the dummy signal 715 is still low and the dummy bar signal 714 is still high, thereby causing the VP signal 718 to keep decreasing and the VM signal 719 to keep increasing. At a point in time after t1, the dummy signal 712 goes to a high voltage and the dummy bar signal 714 decreases to a low voltage. Thus, the dummy signal 712 charges the capacitor 504 to increase the VP signal 718 and the dummy bar signal 714 discharges the capacitor 506 to decrease the VM signal 719. If the clock signal 716 goes to a low voltage, the switches 501, 502 are disabled and the capacitors 504, 506 hold the charge (e.g., Vdd/2) until the switches 501, 502 are enabled again.

As described above, the comparator 508 periodically (e.g., responsive to a clock pulse) compares the VP signal 718 to the VM signal 709 and generates output values based on comparisons. The accumulator 412 accumulates a threshold number of comparisons to determine whether the clock signals are aligned or misaligned. In the example, of FIG. 7B, the clock signals are unaligned. Thus, the comparator 508 will output more '1's than the example of FIG. 7A, while the clock signals were aligned, because the VP signal 718 is higher than the VM signal 719 for a longer duration of time. Thus, if the accumulator 412 accumulates the threshold number of comparisons, there will be more '1's in the threshold number of comparisons than with respect to the aligned example of FIG. 7A. Accordingly, the accumulator 412 determines that the clock signals are unaligned and can adjust the clock signal used by the serializer circuitry 400 of FIG. 4 or the ADC 304 of FIG. 3 to mitigate the unalignment.

Figure 8A:
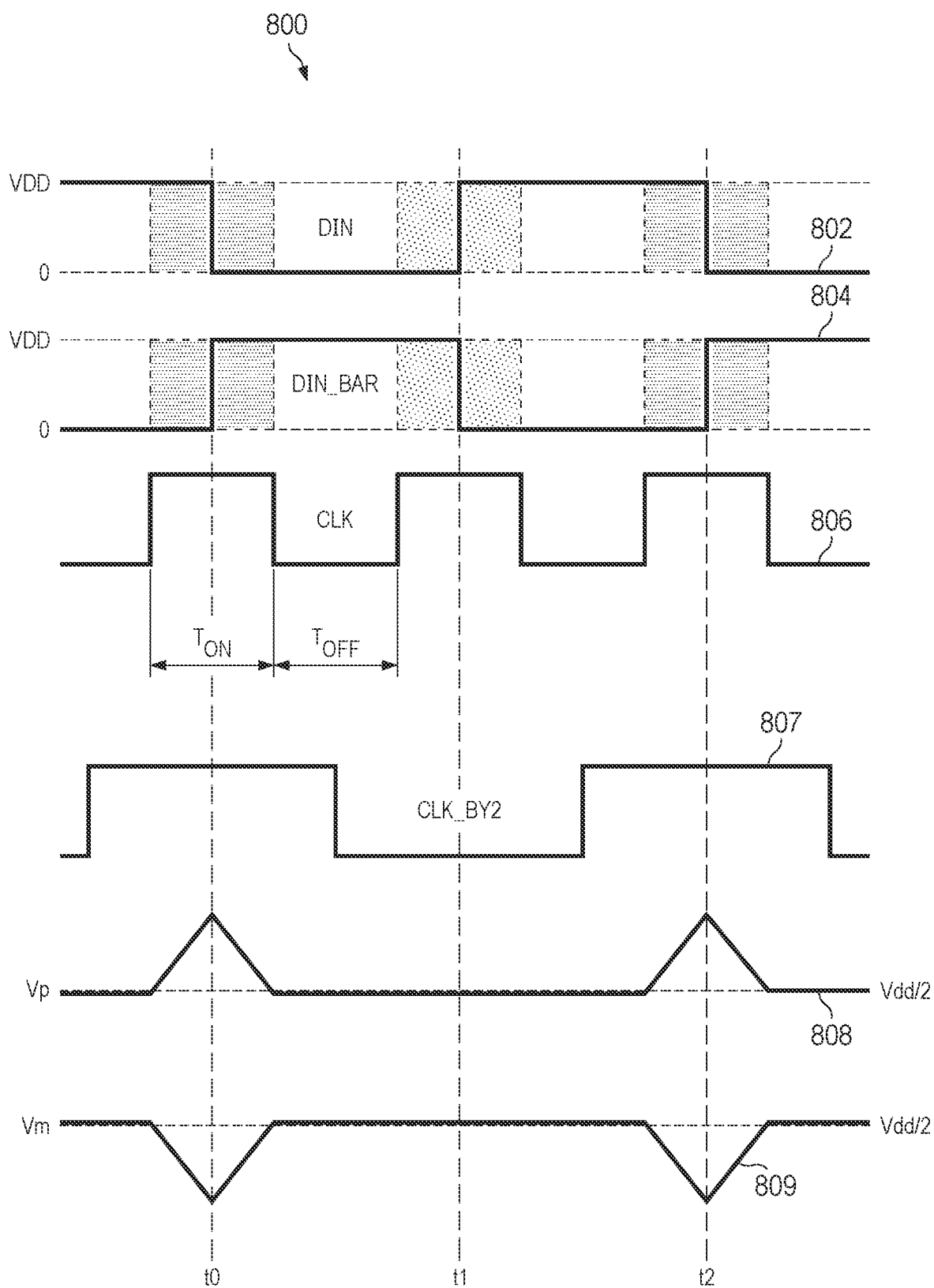

FIG. 8A is an example timing diagram 800 of signals corresponding to the phase detector circuitry 410 of FIG. 5 while the clock signal in the receiver or transmitter is aligned. The example timing diagram 800 includes an example DIN signal 802, an example DIN_BAR signal, an example clock signal 806, an example divided clock signal 807, an example VP signal 808, and an example VM signal 809. The DIN signal 802 corresponds to a dummy signal provided by the example serializer circuitry 400 of FIG. 4 or the ADC 304 of FIG. 3. The DIN_BAR signal 804 corresponds to the dummy bar signal provided by the example serializer circuitry 400 or the ADC 304. The clock signal 806 corresponds to the clock signal provided by the clock and data recovery circuitry 306, 408 of FIG. 3 or 4. The divided clock signal 807 corresponds to the output signal of the divider circuitry 600 of FIG. 6 used to control the switches 602, 604. The VP signal 808 corresponds to the voltage at the VP node of FIG. 5. The VM signal 809 corresponds to the voltage at the VM node of FIG. 5.

During the first pulse of the clock signals 806, 807 if the switches 501, 502, 602, 604 are enabled, the dummy signal 802 is high and the dummy bar signal 804 is low. Thus, the dummy signal 802 charges the capacitor 504 to increase the VP signal 808 and the dummy bar signal 804 discharges the capacitor 506 to decrease the VM signal 809. At time t0, the dummy signal 802 drops to a low voltage and the dummy bar signal 804 goes to a high voltage. Thus, the dummy signal 802 discharges the capacitor 504 to decrease the VP signal 808 and the dummy bar signal 804 charges the capacitor 506 to increase the VM signal 809. If the clock signal 806 goes to a low voltage, the switches 501, 502 are disabled and the capacitors 504, 506 hold the charge (e.g., Vdd/2) until the switches 501, 502, 602, 604 are enabled again.

During the second pulse of the clock signal 806, if the switches 501, 502 are enabled, the divided clock signal 807 is low. Thus, the switches 602, 604 are disabled so the dummy signal 802 and the dummy bar signal 804 cannot charge or discharge the capacitors 504, 506. Thus, during the second pulse of the clock sign 806, the capacitors 504, 506 hold the charge (e.g., Vdd/2) until the switches 5510, 502, 602, 604 are enabled again.

As described above, the comparator 508 periodically (e.g., responsive to a clock pulse) compares the VP signal 808 to the VM signal 809 and generates output values based on comparisons. The accumulator 412 accumulates a threshold number of comparisons to determine whether the clock signals are aligned or misaligned. In the example, of FIG. 8A, the clock signals are aligned. However, FIG. 8B illustrates another example where the clock signals are unaligned.

Figure 8B:
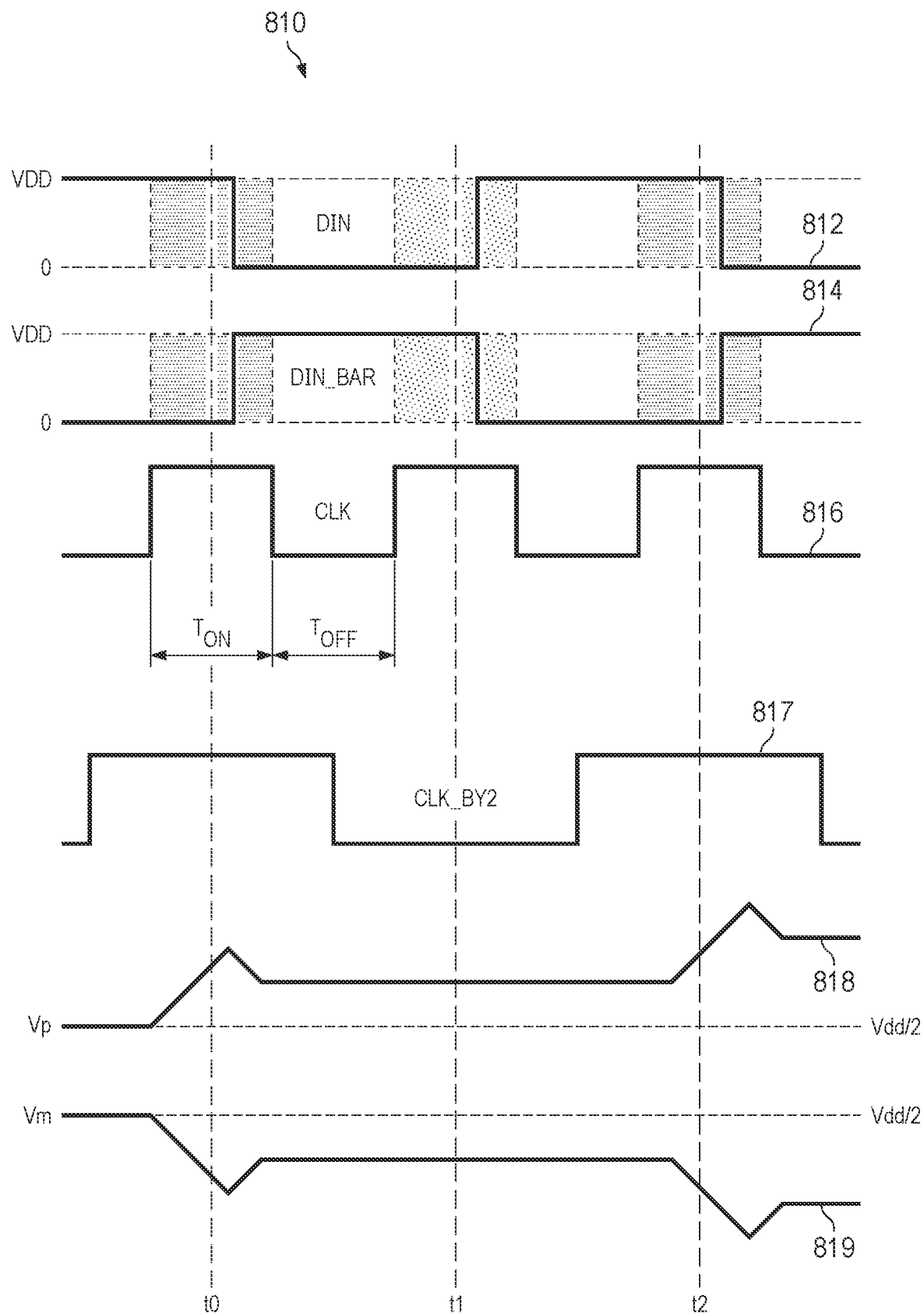

FIG. 8B is an example timing diagram 810 of signals corresponding to the phase detector circuitry 410 of FIG. 5 while the clock signal in the receiver or transmitter is unaligned. The example timing diagram 810 includes an example DIN signal 812, an example DIN_BAR signal, an example clock signal 816, an example divided clock signal 817, an example VP signal 818, and an example VM signal 819. The DIN signal 812 corresponds to a dummy signal provided by the example serializer circuitry 400 of FIG. 4 or the ADC 304 of FIG. 3. The DIN_BAR signal 814 corresponds to the dummy bar signal provided by the example serializer circuitry 400 or the ADC 304. The clock signal 816 corresponds to the clock signal provided by the clock and data recovery circuitry 306, 408 of FIG. 3 or 4. The divided clock signal 817 corresponds to the output signal of the divider circuitry 600 of FIG. 6 used to control the switches 602, 604. The VP signal 818 corresponds to the voltage at the VP node of FIG. 5. The VM signal 819 corresponds to the voltage at the VM node of FIG. 5.

During the first pulse of the clock signal 816, if the switches 501, 502, 602, 604 are enabled, the dummy signal 812 is high and the dummy bar signal 814 is low. Thus, the dummy signal 812 charges the capacitor 504 to increase the VP signal 818 and the dummy bar signal 814 discharges the capacitor 506 to decrease the VM signal 819. For a duration of time after time t0, the dummy signal 815 is still high and the dummy bar signal 814 is still low, thereby causing the VP signal 818 to keep increasing and the VM signal 819 to keep decreasing. At a point in time after t0, the dummy signal 812 drops to a low voltage and the dummy bar signal 814 goes to a high voltage. Thus, the dummy signal 812 discharges the capacitor 504 to decrease the VP signal 818 and the dummy bar signal 814 charges the capacitor 506 to increase the VM signal 819. If the clock signal 816 goes to a low voltage, the switches 501, 502 are disabled and the capacitors 504, 506 hold the charge (e.g., a voltage above Vdd/2 for the VP signal 818 and a voltage below VDD/2 for the VM signal 819) until the switches 501, 502, 602 604 are enabled again.

During the second pulse of the clock signal 816, if the switches 501, 502 are enabled, the clock signal 817 is a low voltage. Thus, the switches 602, 604 are disabled. Accordingly, at time t1, the capacitors 504, 506 hold the charge (e.g., above Vdd/2 for the VP signal 818 and below Vdd/2 for the VM signal 819) until the switches 501, 502, 602, 604 are enabled again.

As described above, the comparator 508 periodically (e.g., responsive to a clock pulse) compares the VP signal 818 to the VM signal 809 and generates output values based on comparisons. The accumulator 412 accumulates a threshold number of comparisons to determine whether the clock signals are aligned or misaligned. In the example, of FIG. 8B, the clock signals are unaligned. Thus, the comparator 508 will output more '1's than the example of FIG. 8A, while the clock signals were aligned, because the VP signal 818 is higher than the VM signal 819 for a longer duration of time. Thus, if the accumulator 412 accumulates the threshold number of comparisons, there will be more '1's in the threshold number of comparisons than with respect to the aligned example of FIG. 8A. Accordingly, the accumulator 412 determines that the clock signals are unaligned and can adjust the clock signal used by the serializer circuitry 400 of FIG. 4 or the ADC 304 of FIG. 3 to mitigate the unalignment.

Figure 9:
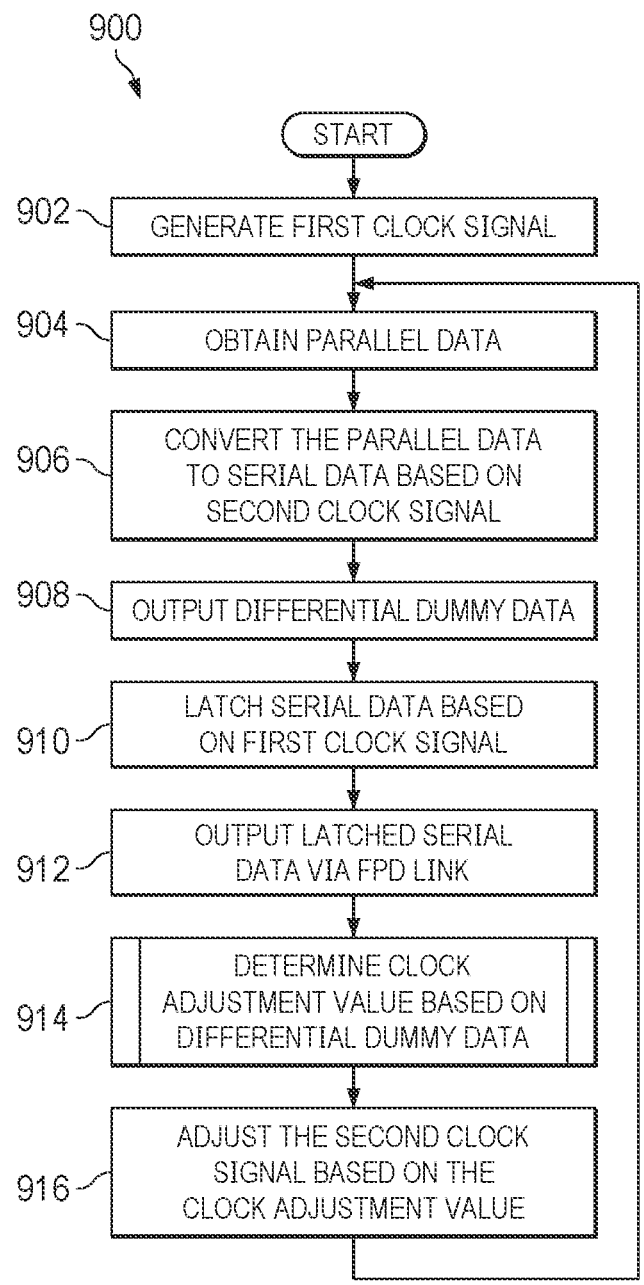
FIG. 9 is a flowchart representative of a method or operations that may be executed to implement the transmitter of FIGS. 1, 2, and 4.

FIG. 9 is a flowchart representative of a method and/or example operations 900 that may be executed and/or instantiated by programmable circuitry and/or any other circuitry of the transmitter 106 of FIGS. 1, 2 and, 4 to facilitate phase detection for data clock synchronization. Although the instructions and/or operations of FIG. 9 are described in conjunction with the transmitter 106 of FIGS. 1, 2 and 4, the instructions and/or operations may be described in conjunction with the receiver 104 of FIGS. 1-3 and/or any other receiver and/or transmitter. The machine-readable instructions and/or the operations 900 of FIG. 9 begin at block 902, at which the clock generation circuitry 408 generates a first clock signal. The first clock signal is provided to the sampler 404 to sample incoming data that has been serialized by the serializer circuitry 400. Also, the clock signal can be used by the phase detector 410 to determine a phase difference between the first clock signal and a second clock signal used by the serializer circuitry 400, as further described below.

At block 904, the example serializer circuitry 400 receives parallel data. For example, the parallel data may be serial data that was received and converted into parallel data by the example receiver circuitry 104 of FIGS. 1, 2, and 3. The serializer circuitry 400 may receive the parallel data from a digital processor after being processed. At block 906, the serializer circuitry 400 converts the received parallel data to serial data responsive to the second clock signal. The second clock signal is the first clock signal from the clock generation circuitry 408 after being adjusted to compensate for an identified phase difference between the first clock signal and the second clock signal. At block 908, the example serializer circuitry 400 provides differential dummy data (e.g., corresponding to the dummy signal 702, 712, 802, 812 and the dummy signal bar 704, 714, 804, 814 of FIGS. 7A-8B) responsive to the second clock signal to the example phase detector circuitry 410. At block 910, the example sampler 404 latches/gates the serial data responsive to the first clock signal provided by the clock generation circuitry 408. At block 912, the example output driver 406 provides the latched serial data via an FPD link to another device within the system. In some examples, the output driver 406 can provide the latched serial data via any network connection. At block 914, the example phase detector circuitry 410 and the accumulator 412 determines a clock adjustment value based on the differential dummy data, as further described below in conjunction with FIG. 10. At block 916, the delay control circuitry 414 adjusts the second clock signal responsive to the clock adjustment value. For example, the delay control circuitry 414 causes the clock divider 416 to adjust the first clock signal from the clock generation circuitry 408 to provide the second clock signal to the serializer circuitry 400 that mitigates a phase difference between the first and second clock signals.

Figure 10:
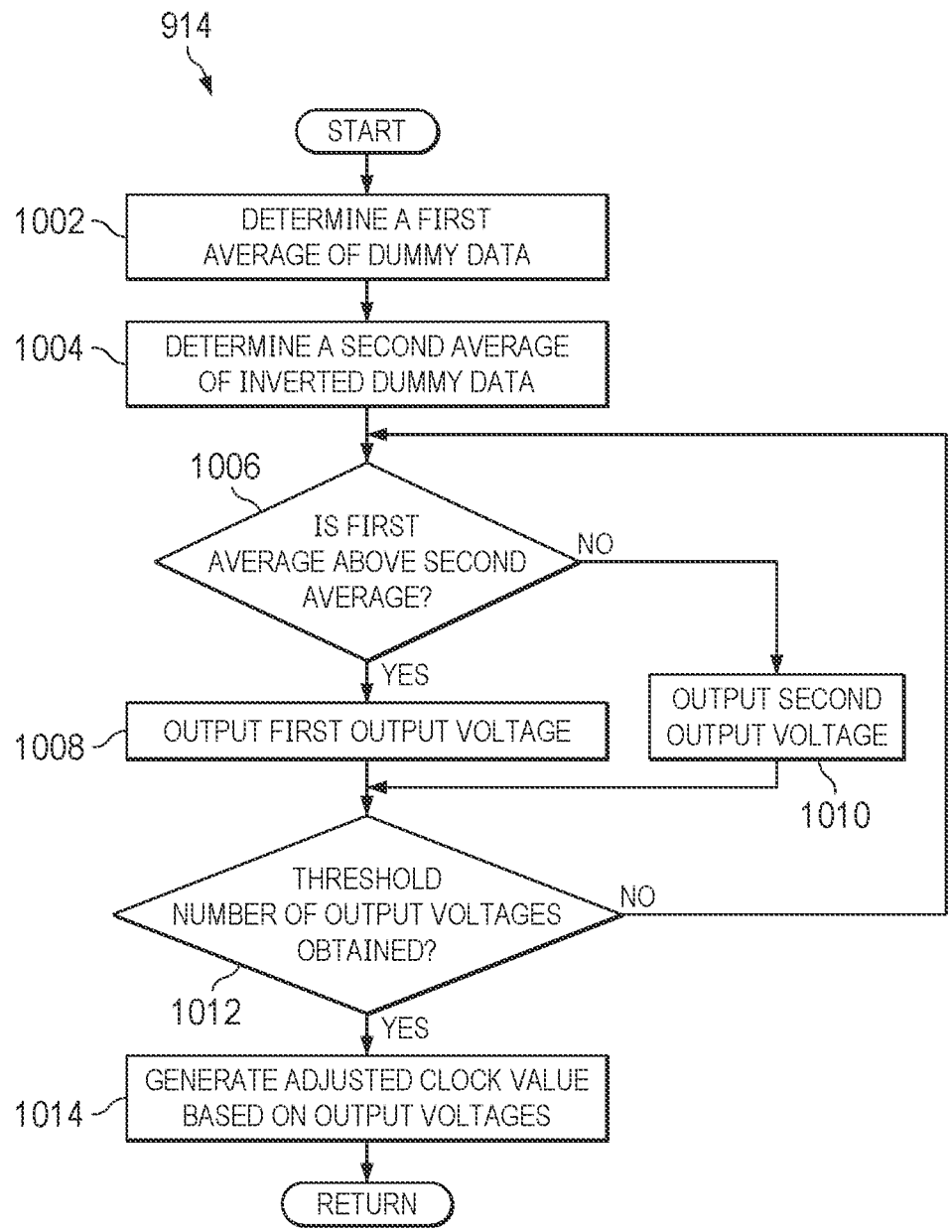
FIG. 10 is a flowchart representative of a method or operations that may be executed to implement the phase detection circuitry of FIG. 5 or 6.

FIG. 10 is a flowchart representative of a method and/or example operations 914 that may be executed and/or instantiated by programmable circuitry and/or any other circuitry of the phase detector circuitry 410 of FIGS. 5 and/or 6 to determine a clock adjustment value based on the differential dummy data. The machine-readable instructions and/or the operations 1000 of FIG. 10 begin at block 1002, at which the integrator circuitry 500, 601 determines a first average of the dummy data while the switches 501, 502, 602, 604 are enabled. For example, while the switches 501, 502, 602, 604 are enabled, the dummy data charges the capacitor 504. The amount of charge stored in the capacitor 504 while the switches 501, 502 are disabled corresponds to an average voltage that can be used to determine the alignment of the first clock signal used to control the switches 501, 502 and the second clock signal used to generate the dummy data. The first average corresponds to the voltage at the VP node.

At block 1004, the integrator circuitry 500, 601 determines a second average for the dummy bar data while the switches 501, 502, 602, 604 are enabled. The second average corresponds to the voltage at the VM node. At block 1006, the example comparator 508 determines if the first average is above the second average. If the comparator 508 determines that the first average is above the second average (block 1006: YES), the comparator 508 provides a first output voltage (e.g., a high voltage or '1') (block 1008). If the comparator 508 determines that the first average is not above the second average (block 1006: NO), the comparator 508 provides a second output voltage (e.g., a low voltage or '0') (block 1010). The voltage provided by the comparator 508 is received by the accumulator 412.

At block 1012, the accumulator 412 determines if a threshold number of output voltages from the comparator 508 have been received. If the accumulator 412 determines that a threshold number of output voltages have not been received (block 1012: NO), control returns to block 1006 to receive another output voltage from the comparator 508, while the integrator circuitry 500, 601 continue to adjust the VP, VM voltages responsive to the clock signal and the differential dummy signals. If the accumulator 412 determines that a threshold number of output voltage has been received (block 1012: YES), the accumulator 412 generates an adjusted clock value based on the output voltages (block 1014). For example, the accumulator 412 can generate an adjusted clock value based on the number or ratio of first output voltages versus second output voltages. After block 1014, control returns to block 916 of FIG. 9.

An example manner of implementing the circuitries 104, 106 of FIG. 1 is illustrated in FIGS. 3 and 4 and an example manner of implementing the phase detector circuitry 410 is shown in FIGS. 5 and 6. However, one or more of the elements, processes and/or devices illustrated in FIG. 1-6 may be combined, divided, re-arranged, omitted, eliminated and/or implemented in any other way.

Further, the serializer circuitry 400, the sampler circuitry 404, the output driver 406, the clock generation circuitry 408, the phase detector circuitry 410, the accumulator circuitry 412, the delay control circuitry 414, the clock divider 416, the frontend circuitry 300, the sampler 302, the ADC 304, the clock generator circuitry 306, the phase detector circuitry 308, the accumulator circuitry 310, the delay control circuitry 312, and/or the clock divider circuitry 314 of FIGS. 3 and/or 4 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)).

When reading any of the apparatus or system claims of this patent to cover a purely software and/or firmware implementation, at least one of the serializer circuitry 400, the sampler circuitry 404, the output driver 406, the clock generation circuitry 408, the phase detector circuitry 410, the accumulator circuitry 412, the delay control circuitry 414, the clock divider 416, the frontend circuitry 300, the sampler 302, the ADC 304, the clock generator circuitry 306, the phase detector circuitry 308, the accumulator circuitry 310, the delay control circuitry 312, and/or the clock divider circuitry 314 of FIGS. 3 and/or 4 is/are hereby expressly defined to include a non-transitory computer readable storage device or storage disk such as a memory, a digital versatile disk (DVD), a compact disk (CD), a Blu-ray disk, etc., including the software and/or firmware. Further still, the serializer circuitry 400, the sampler circuitry 404, the output driver 406, the clock generation circuitry 408, the phase detector circuitry 410, the accumulator circuitry 412, the delay control circuitry 414, the clock divider 416, the frontend circuitry 300, the sampler 302, the ADC 304, the clock generator circuitry 306, the phase detector circuitry 308, the accumulator circuitry 310, the delay control circuitry 312, and/or the clock divider circuitry 314 of FIGS. 3 and/or 4 may include one or more elements, processes and/or devices in addition to, or instead of, those illustrated in FIGS. 3 and/or 4, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather also includes selective communication at periodic intervals, scheduled intervals, aperiodic intervals, and/or one-time events.

Flowcharts representative of example hardware logic, machine-readable instructions, hardware implemented state machines, and/or any combination thereof for implementing the circuitries 104, 106 of FIGS. 1, 2, 3, 4, 5 and/or 6 are shown in FIGS. 9-10. The machine-readable instructions may be one or more executable programs or portion(s) of an executable program for execution by a computer processor. The program may be embodied in software stored on a non-transitory computer readable storage medium such as a CD-ROM, a floppy disk, a hard drive, a DVD, a Blu-ray disk, or a memory associated with the processor, but the entire program and/or parts thereof could alternatively be executed by a device other than the processor and/or embodied in firmware or dedicated hardware.

Further, although the example program is described with reference to the flowchart illustrated in FIGS. 9-10, many other methods of implementing the circuitries 104, 106 may alternatively be used. For example, the order of execution of the blocks may be changed, and/or some of the blocks described may be changed, eliminated, or combined. Also or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine-readable instructions described herein may be stored in one or more of a compressed format, an encrypted format, a fragmented format, a compiled format, an executable format, a packaged format, etc. Machine-readable instructions as described herein may be stored as data (e.g., portions of instructions, code, representations of code, etc.) that may be utilized to create, manufacture, and/or produce machine executable instructions. For example, the machine-readable instructions may be fragmented and stored on one or more storage devices and/or computing devices (e.g., servers). The machine-readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine-readable instructions may be stored in multiple parts, which are individually compressed, encrypted, and stored on separate computing devices, in which the parts when decrypted, decompressed, and combined form a set of executable instructions that implement a program such as that described herein.

In another example, the machine-readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine-readable instructions may be configured (e.g., settings stored, data input, network addresses recorded, etc.) before the machine-readable instructions and/or the corresponding program(s) can be executed in whole or in part. As a result, the described machine-readable instructions and/or corresponding program(s) encompass such machine-readable instructions and/or program(s) regardless of the particular format or state of the machine-readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 9-10 may be implemented using executable instructions (e.g., computer and/or machine-readable instructions) stored on a non-transitory computer and/or machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

Descriptors "first," "second," "third," etc. are used herein when identifying multiple elements or components which may be referred to separately. Unless otherwise specified or known based on their context of use, such descriptors do not impute any meaning of priority, physical order, or arrangement in a list, or ordering in time but are merely used as labels for referring to multiple elements or components separately for ease of understanding the described examples. In some examples, the descriptor "first" may be used to refer to an element in the detailed description, while the same element may be referred to in a claim with a different descriptor such as "second" or "third." In such instances, such descriptors are used merely for ease of referencing multiple elements or components.

In the description and in the claims, the terms "including" and "having" and variants thereof are to be inclusive in a manner similar to the term "comprising" unless otherwise noted. Unless otherwise stated, "about," "approximately," or "substantially" preceding a value means+/−10 percent of the stated value. In another example, "about," "approximately," or "substantially" preceding a value means+/−5 percent of the stated value. IN another example, "about," "approximately," or "substantially" preceding a value means+/−1 percent of the stated value.

The term "couple", "coupled", "couples", and variants thereof, as used herein, may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A. Moreover, the terms "couple", "coupled", "couples", or variants thereof, includes an indirect or direct electrical or mechanical connection.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

Although not all separately labeled in the FIGS. 1-6, components or elements of systems and circuits illustrated therein have one or more conductors or terminus that allow signals into and/or out of the components or elements. The conductors or terminus (or parts thereof) may be referred to herein as pins, pads, terminals (including input terminals, output terminals, reference terminals, and ground terminals, for instance), inputs, outputs, nodes, and interconnects.

As used herein, a "terminal" of a component, device, system, circuit, integrated circuit, or other electronic or semiconductor component, generally refers to a conductor such as a wire, trace, pin, pad, or other connector or interconnect that enables the component, device, system, etc., to electrically and/or mechanically connect to another component, device, system, etc. A terminal may be used, for instance, to receive or provide analog or digital electrical signals (or simply signals) or to electrically connect to a common or ground reference. Accordingly, an input terminal or input is used to receive a signal from another component, device, system, etc. An output terminal or output is used to provide a signal to another component, device, system, etc. Other terminals may be used to connect to a common, ground, or voltage reference, e.g., a reference terminal or ground terminal. A terminal of an IC or a PCB may also be referred to as a pin (a longitudinal conductor) or a pad (a planar conductor). A node refers to a point of connection or interconnection of two or more terminals. An example number of terminals and nodes may be shown. However, depending on a particular circuit or system topology, there may be more or fewer terminals and nodes. However, in some instances, "terminal", "node", "interconnect", "pad", and "pin" may be used interchangeably.

Example methods, apparatus, systems, and articles of manufacture corresponding to facilitate phase detection for data clock synchronization are described herein. Further examples and combinations thereof include the following: Example 1 includes a phase detection circuit comprising a first switch having a control terminal, a first terminal, and a second terminal, the control terminal of the first switch coupled to a clock generator, a second switch having a control terminal, a first terminal, and a second terminal, the control terminal of the second switch coupled to the clock generator, a first capacitor having a first terminal and a second terminal, the first terminal of the first capacitor coupled to the second terminal of the first switch, a second capacitor having a first terminal and a second terminal, the first terminal of the second capacitor coupled to the second terminal of the second switch, and a comparator having a first input terminal, a second input terminal, and an output terminal, the first input terminal of the comparator coupled to the second terminal of the first switch and the first terminal of the first capacitor, the second input terminal of the comparator coupled to the second terminal of the second switch and the first terminal of the second capacitor.

Example 2 includes the phase detection circuit of example 1, further including a third switch having a first terminal and a second terminal, the first terminal of third switch coupled to the first terminal of the first switch, and a fourth switch having a first terminal and a second terminal, the first terminal of the fourth switch coupled to the first terminal of the second switch.

Example 3 includes the phase detection circuit of example 2, wherein the third switch includes a control terminal and the fourth switch includes a control terminal, further including divider circuitry having a first terminal and a second terminal, the first terminal of the divider circuitry coupled to the clock generator, the second terminal of the divider circuitry coupled to the control terminal of the third switch and the control terminal of the fourth switch.

Example 4 includes the phase detection circuit of example 2, wherein the first terminal of the first switch and the first terminal of the second switch is coupled to serializer circuitry, the serializer circuitry having an output terminal coupled to a flat panel display link.

Example 5 includes the phase detection circuit of example 1, wherein the first input terminal of the comparator is a non-inverting input terminal and the second input terminal of the comparator is an inverting input terminal.

Example 6 includes the phase detection circuit of example 1, wherein the first terminal of the first switch is coupled to a first data input terminal and the first terminal of the second switch is coupled to a second data input terminal, the first data input terminal configured to receive a first data signal and the second data input terminal configured to receive a second data signal differential to the first data signal.

Example 7 includes the phase detection circuit of example 1, wherein the first switch is configured to receive a system clock signal at the control terminal of the first switch and the second switch is configured to receive the system clock signal at the control terminal of the second switch.

Example 8 includes a transmitter circuit comprising serializer circuitry having parallel input terminals, a clock input terminal, and a serial output terminal, the serializer circuitry to receive parallel data via the parallel input terminals of the serializer circuitry, the serializer circuitry to output data via the serial output terminal of the serializer circuitry based on a first clock signal, clock circuitry having a terminal, the clock circuitry to output a second clock signal via the terminal of the clock circuitry, phase detector circuitry having a switch having a control terminal, a first terminal, and a second terminal, the control terminal of the switch coupled to the clock circuitry, the first terminal of the switch coupled to the serial output terminal of the serializer circuitry, a capacitor having a terminal coupled to the second terminal of the switch, and a comparator having an input terminal and an output terminal, the input terminal of the comparator coupled to the second terminal of the switch and the terminal of the capacitor, and accumulator circuitry having an input terminal and an output terminal, the input terminal of the accumulator circuitry coupled to the output terminal of the comparator, the accumulator circuitry to generate an output signal based on an output of the comparator, the output signal to adjust the second clock signal to the first clock signal.

Example 9 includes the transmitter circuit of example 8, wherein the serial output terminal of the serializer circuitry is a first serial output terminal, the serializer circuitry having a second serial output terminal, the serialized circuitry to convert the parallel data into serial data, and output the serial data via the second serial output terminal.

Example 10 includes the transmitter circuit of example 9, further including sampler circuitry having a first input terminal, a second input terminal, and an output terminal, the first input terminal of the sampler circuitry coupled to the second serial output terminal of the serializer circuitry, the second input terminal of the sampler circuitry coupled to the terminal of the clock circuitry.

Example 11 includes the transmitter circuit of example 10, further including driver circuitry having an input terminal and an output terminal, the input terminal of the driver circuitry coupled to the output terminal of the sampler circuitry, the output terminal of the driver circuitry coupled to a flat panel display link.

Example 12 includes the transmitter circuit of example 11, wherein the sampling circuitry is to output the serialized data based on the first clock signal.

Example 13 includes the transmitter circuit of example 8, further including delay control circuitry to generate a delay value based on the output signal of the accumulator circuitry, and clock diver circuitry to adjust the first clock signal to the second clock signal based on the delay value.

Example 14 includes a receiver circuit comprising an analog-to-digital converter having an input terminal, a clock input terminal, and an output terminal, the analog-to-digital converter to receive analog data via the input terminal of the analog-to-digital converter, the analog-to-digital converter to output data via the output terminal of the analog-to-digital converter based on a first clock signal, clock circuitry having a terminal, the clock circuitry to output a second clock signal via the terminal of the clock circuitry, phase detector circuitry having a switch having a control terminal, a first terminal, and a second terminal, the control terminal of the switch coupled to the clock circuitry, the first terminal coupled to the clock input terminal of the analog-to-digital converter, a capacitor having a terminal coupled to the second terminal of the switch, and a comparator having an input terminal and an output terminal, the input terminal of the comparator coupled to the second terminal of the switch and the terminal of the capacitor, and accumulator circuitry having an input terminal and an output terminal, the input terminal of the accumulator circuitry coupled to the output terminal of the comparator, the accumulator circuitry to generate an output signal based on an output of the comparator, the output signal to adjust the second clock signal to the first clock signal.

Example 15 includes the receiver circuit of example 14, wherein the analog-to-digital converter is to convert the analog data to digital data, and output the digital data via the output terminal.

Example 16 includes the receiver circuit of example 15, further including sampler circuitry having a first input terminal, a second input terminal, and an output terminal, the second input terminal of the sampler circuitry coupled to the terminal of the clock circuitry, the output terminal of the sampler circuitry coupled to the input terminal of the analog-to-digital converter.

Example 17 includes the receiver circuit of example 16, further including frontend circuitry having an input terminal and an output terminal, the input terminal of the frontend circuitry to receive data via a flat panel display link, the output terminal of the frontend circuitry coupled to the first input terminal of the sampler circuitry.

Example 18 includes the receiver circuit of example 17, wherein the sampler circuitry is to output the analog data based on the first clock signal.

Example 19 includes the receiver circuit of example 14, further including delay control circuitry to generate a delay value based on the output signal of the accumulator circuitry, and clock diver circuitry to adjust the first clock signal to the second clock signal based on the delay value.

Modifications are possible in the described examples, and other examples are possible, within the scope of the claims.

What is claimed is:

1. A phase detection circuit comprising:
    a first switch having a control terminal, a first terminal, and a second terminal, the control terminal of the first switch coupled to a clock generator;
    a second switch having a control terminal, a first terminal, and a second terminal, the control terminal of the second switch coupled to the clock generator;
    a first capacitor having a first terminal and a second terminal, the first terminal of the first capacitor coupled to the second terminal of the first switch;
    a second capacitor having a first terminal and a second terminal, the first terminal of the second capacitor coupled to the second terminal of the second switch; and
    a comparator having a first input terminal, a second input terminal, and an output terminal, the first input terminal of the comparator coupled to the second terminal of the first switch and the first terminal of the first capacitor, the second input terminal of the comparator coupled to the second terminal of the second switch and the first terminal of the second capacitor.

2. The phase detection circuit of claim 1, further including:
    a third switch having a first terminal and a second terminal, the first terminal of third switch coupled to the first terminal of the first switch; and
    a fourth switch having a first terminal and a second terminal, the first terminal of the fourth switch coupled to the first terminal of the second switch.

3. The phase detection circuit of claim 2, wherein the third switch includes a control terminal and the fourth switch includes a control terminal, further including divider circuitry having a first terminal and a second terminal, the first terminal of the divider circuitry coupled to the clock generator, the second terminal of the divider circuitry coupled to the control terminal of the third switch and the control terminal of the fourth switch.

4. The phase detection circuit of claim 2, wherein the first terminal of the first switch and the first terminal of the second switch is coupled to serializer circuitry, the serializer circuitry having an output terminal coupled to a flat panel display link.

5. The phase detection circuit of claim 1, wherein the first input terminal of the comparator is a non-inverting input terminal and the second input terminal of the comparator is an inverting input terminal.

6. The phase detection circuit of claim 1, wherein the first terminal of the first switch is coupled to a first data input terminal and the first terminal of the second switch is coupled to a second data input terminal, the first data input terminal configured to receive a first data signal and the second data input terminal configured to receive a second data signal differential to the first data signal.

7. The phase detection circuit of claim 1, wherein the first switch is configured to receive a system clock signal at the control terminal of the first switch and the second switch is configured to receive the system clock signal at the control terminal of the second switch.

8. A transmitter circuit comprising:
    serializer circuitry having parallel input terminals, a clock input terminal, and a serial output terminal, the serializer circuitry to receive parallel data via the parallel input terminals of the serializer circuitry, the serializer circuitry to output data via the serial output terminal of the serializer circuitry responsive to a first clock signal;
    clock circuitry having a terminal, the clock circuitry to output a second clock signal via the terminal of the clock circuitry;
    phase detector circuitry including:
        a switch having a control terminal, a first terminal, and a second terminal, the control terminal of the switch coupled to the clock circuitry, the first terminal of the switch coupled to the serial output terminal of the serializer circuitry;
        a capacitor having a terminal coupled to the second terminal of the switch; and
        a comparator having an input terminal and an output terminal, the input terminal of the comparator coupled to the second terminal of the switch and the terminal of the capacitor; and
    accumulator circuitry having an input terminal and an output terminal, the input terminal of the accumulator circuitry coupled to the output terminal of the comparator, the accumulator circuitry to generate an output signal based on an output of the comparator, the output signal to adjust the second clock signal to the first clock signal.

9. The transmitter circuit of claim 8, wherein the serial output terminal of the serializer circuitry is a first serial output terminal, the serializer circuitry having a second serial output terminal, the serializer circuitry to:
    convert the parallel data into serial data; and
    output the serial data via the second serial output terminal.

10. The transmitter circuit of claim 9, further including:
    sampler circuitry having a first input terminal, a second input terminal, and an output terminal, the first input terminal of the sampler circuitry coupled to the second serial output terminal of the serializer circuitry, the second input terminal of the sampler circuitry coupled to the terminal of the clock circuitry.

11. The transmitter circuit of claim 10, further including driver circuitry having an input terminal and an output terminal, the input terminal of the driver circuitry coupled to the output terminal of the sampler circuitry, the output terminal of the driver circuitry coupled to a flat panel display link.

12. The transmitter circuit of claim 11, wherein the sampling circuitry is to output the serialized data responsive to the first clock signal.

13. The transmitter circuit of claim 8, further including:
delay control circuitry to generate a delay value based on the output signal of the accumulator circuitry; and
clock diver circuitry to adjust the first clock signal to the second clock signal based on the delay value.

14. A receiver circuit comprising:
an analog-to-digital converter having an input terminal, a clock input terminal, and an output terminal, the analog-to-digital converter to receive analog data via the input terminal of the analog-to-digital converter, the analog-to-digital converter to output data via the output terminal of the analog-to-digital converter responsive to a first clock signal;
clock circuitry having a terminal, the clock circuitry to output a second clock signal via the terminal of the clock circuitry;
phase detector circuitry including:
a switch having a control terminal, a first terminal, and a second terminal, the control terminal of the switch coupled to the clock circuitry, the first terminal coupled to the clock input terminal of the analog-to-digital converter;
a capacitor having a terminal coupled to the second terminal of the switch; and
a comparator having an input terminal and an output terminal, the input terminal of the comparator coupled to the second terminal of the switch and the terminal of the capacitor; and
accumulator circuitry having an input terminal and an output terminal, the input terminal of the accumulator circuitry coupled to the output terminal of the comparator, the accumulator circuitry to generate an output signal based on an output of the comparator, the output signal to adjust the second clock signal to the first clock signal.

15. The receiver circuit of claim 14, wherein the analog-to-digital converter is to:
convert the analog data to digital data; and
output the digital data via the output terminal.

16. The receiver circuit of claim 15, further including sampler circuitry having a first input terminal, a second input terminal, and an output terminal, the second input terminal of the sampler circuitry coupled to the terminal of the clock circuitry, the output terminal of the sampler circuitry coupled to the input terminal of the analog-to-digital converter.

17. The receiver circuit of claim 16, further including frontend circuitry having an input terminal and an output terminal, the input terminal of the frontend circuitry to receive data via a flat panel display link, the output terminal of the frontend circuitry coupled to the first input terminal of the sampler circuitry.

18. The receiver circuit of claim 17, wherein the sampler circuitry is to output the analog data responsive to the first clock signal.

19. The receiver circuit of claim 14, further including:
delay control circuitry to generate a delay value responsive to the output signal of the accumulator circuitry; and
clock diver circuitry to adjust the first clock signal to the second clock signal responsive to the delay value.

* * * * *